US011640170B1

(12) United States Patent
Bagwell et al.

(10) Patent No.: US 11,640,170 B1
(45) Date of Patent: May 2, 2023

(54) IDENTIFICATION OF PARTICULATE MATTER IN SENSOR DATA

(71) Applicant: Zoox, Inc., Foster City, CA (US)

(72) Inventors: Carden Taylor Bagwell, San Francisco, CA (US); David Pfeiffer, Foster City, CA (US); Zeng Wang, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 811 days.

(21) Appl. No.: 16/667,603

(22) Filed: Oct. 29, 2019

(51) Int. Cl.
| | |
|---|---|
| *G05D 1/02* | (2020.01) |
| *G01N 15/00* | (2006.01) |
| *G05D 1/00* | (2006.01) |
| *G01S 17/02* | (2020.01) |
| *G01S 17/931* | (2020.01) |

(52) U.S. Cl.
CPC ........... *G05D 1/0212* (2013.01); *G01N 15/00* (2013.01); *G01S 17/02* (2013.01); *G01S 17/931* (2020.01); *G05D 1/0088* (2013.01); *G05D 2201/0213* (2013.01)

(58) Field of Classification Search
CPC ............... G05D 1/0212; G05D 1/0088; G05D 2201/0213; G01N 15/00; G01S 17/02; G01S 17/931
See application file for complete search history.

(56) References Cited

U.S. PATENT DOCUMENTS

| 9,645,577 B1 | 5/2017 | Frazzoli et al. |
| 2015/0158486 A1 | 6/2015 | Healey et al. |
| 2016/0207530 A1 | 7/2016 | Stanek et al. |
| 2017/0161570 A1 | 6/2017 | Zhao et al. |
| 2018/0284803 A1 | 10/2018 | Lee et al. |

(Continued)

FOREIGN PATENT DOCUMENTS

| EP | 3456597 A2 | 3/2019 |
| WO | WO2014047250 A1 | 3/2014 |

(Continued)

OTHER PUBLICATIONS

P. Sallis, C. Dannheim, C. Icking and M. Maeder, "Air Pollution and Fog Detection through Vehicular Sensors," 2014 8th Asia Modelling Symposium, 2014, pp. 181-186, doi: 10.1109/AMS.2014.43. (Year: 2014).*

Office Action for U.S. Appl. No. 16/586,650, dated Mar. 21, 2022, Beller, "Planning Accommodations for Particulate Matter", 39 pages.

(Continued)

*Primary Examiner* — Thomas Ingram
(74) *Attorney, Agent, or Firm* — Lee & Hayes, P.C.

(57) ABSTRACT

Techniques for detecting an object in an environment and determining a probability that the object is a cloud of particulate matter. The cloud of particulate matter may include steam (e.g., emitted from a man-hole cover, a dryer exhaust port, etc.), exhaust from a vehicle (e.g., car, truck, motorcycle, etc.), environmental gases (e.g., resulting from sublimation, fog, evaporation, etc.), a cloud of dust, water splashing, blowing leaves, or other types of particulate matter that may be located in the environment of the vehicle and may not impact driving behavior (e.g., an autonomous vehicle may safely pass through the particulate matter without impact to the platform). A vehicle computing system may determine the probability that the object is a cloud of particulate matter and may control the vehicle based on the probability.

20 Claims, 7 Drawing Sheets

(56) References Cited

U.S. PATENT DOCUMENTS

| | | |
|---|---|---|
| 2018/0326982 A1 | 11/2018 | Paris et al. |
| 2019/0064829 A1 | 2/2019 | Ozawa et al. |
| 2020/0042001 A1 | 2/2020 | Chu |
| 2020/0309957 A1* | 10/2020 | Bhaskaran ............... G01S 17/86 |
| 2021/0086758 A1 | 3/2021 | Yamanaka et al. |
| 2021/0094538 A1 | 4/2021 | Beller |
| 2021/0116907 A1 | 4/2021 | Altman |

FOREIGN PATENT DOCUMENTS

| | | |
|---|---|---|
| WO | WO2018172849 A1 | 9/2018 |
| WO | WO2019112514 | 6/2019 |

OTHER PUBLICATIONS

International Preliminary Report on Patentability for PCT Application No. PCT/US20/52869, dated Apr. 7, 2022, 9 pgs.

PCT Search Report and Written Opinion dated Jan. 26, 2021 for PCT Application No. PCT/US20/52869, 15 pages.

Office Action for U.S. Appl. No. 16/586,650, dated Dec. 2, 2021, Beller, "Planning Accommodations for Particulate Matter", 36 pages.

Office Action for U.S. Appl. No. 16/586,650, dated Jun. 21, 2021, Beller, "Planning Accommodations for Particulate Matter", 33 pages.

\* cited by examiner

IDENTIFICATION OF PARTICULATE MATTER IN SENSOR DATA

BACKGROUND

Various methods, apparatuses, and systems are utilized to guide autonomous vehicles through environments including various static and dynamic objects. For instance, an autonomous vehicle may include sensors, such as lidar, radar, cameras, and the like, to detect moving and stationary objects in an environment. The sensors may additionally capture data associated with particulate matter, such as steam emanating from a manhole cover, exhaust from vehicles, or the like. In some examples, the autonomous vehicle may utilize the sensor data to make control decisions, such as determining where to drive based in part on the detected objects. However, the autonomous vehicle may perceive the particulate matter as an object to be avoided, which may disrupt forward progress by causing the vehicle to stop or adjust a path to avoid the particulate matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
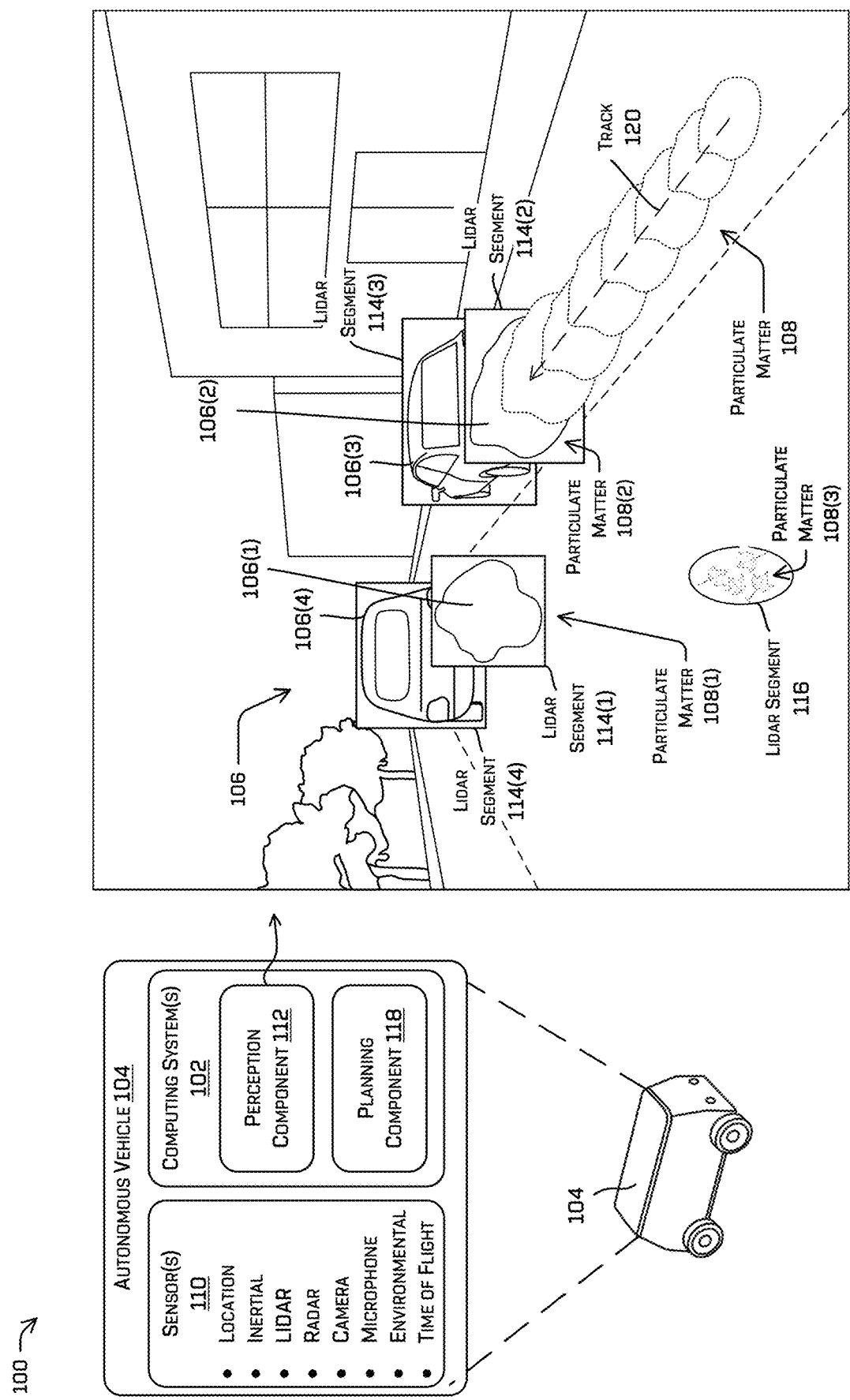
FIG. 1 is an illustration of an example environment in which one or more computing systems of an autonomous vehicle may classify one or more objects in an environment as particulate matter (such as water vapor), in accordance with examples of the disclosure.

This disclosure relates to techniques for detecting an object in an environment and determining a probability that the object is a region (e.g., cloud) of particulate matter. The cloud of particulate matter may include steam (e.g., emitted from a man-hole cover, a dryer exhaust port, etc.), exhaust from a vehicle (e.g., car, truck, motorcycle, etc.), environmental gases (e.g., resulting from sublimation, fog, evaporation, etc.), a cloud of dust, water splashing, blowing leaves, or other types of particulate matter. Such particulate matter may be located in the environment of a vehicle and may not impact driving behavior (e.g., autonomous vehicle may safely pass through the particulate matter without impact to the platform). A vehicle computing system may determine the probability that the object is a cloud of particulate matter and may control the vehicle based on the probability. The techniques described herein improve the accuracy of detection of clouds of particulate matter and therefore improve the operation of the vehicle. Additionally, the improvement to the accuracy of detection of the clouds of particulate matter improves the safe operation of the vehicle in the environment.

The vehicle may include an autonomous, semi-autonomous, or manned vehicle that utilizes sensor data captured by one or more sensors to detect objects in an environment and navigate through the environment based on the objects. The sensor data captured by the vehicle may include lidar data captured by a lidar sensor, as well as data captured by other sensors such as camera sensors, radar sensors, time-of-flight sensors, sonar sensors, and the like. The lidar data may include data associated with a lidar blob (e.g., a cluster of corresponding lidar points or voxels) that is representative of the particulate matter which may be considered by a vehicle computing system when planning a trajectory for the vehicle. As used herein, a lidar blob may include a set of points (e.g., a collection of adjacent lidar points associated with returns captured by the lidar sensor) which have been identified (e.g., using clustering techniques) as belonging to the same object (e.g., an object in the environment or a region of particulate matter, such as a single cloud).

In various embodiments, the vehicle computing system may receive the lidar data from each lidar sensor and may perform semantic segmentation on the lidar data from each lidar sensor to determine point classification associated with each point of the lidar data (e.g., per point semantic class). In at least some examples, the classifications may include a car, truck, bicycle, motorcycle, pedestrian, particulate matter, or the like, in addition to, navigable surface, free space, drivable surface, or the like. In some examples, the point classification may be determined utilizing a first channel of a semantic segmentation tool. In some examples, the semantic segmentation tool may include a second channel configured to determine a probability (e.g., likelihood) that the point is associated with a cloud of particulate matter or other immaterial object (e.g., an object that does not impact driving behavior). In some examples, the probability that the point is associated with a cloud of particulate matter may be represented as a false positive indication that the point is associated with a material object.

In some examples, the semantic segmentation tool may be configured to determine the point classifications and/or probability that the point is associated with a cloud of particulate matter utilizing machine learning techniques. In various examples, the semantic segmentation tool may utilize the techniques described in U.S. patent application Ser. No. 15/820,245 filed Nov. 21, 2017 and entitled "Sensor Data Segmentation," the entire contents of which are incorporated herein by reference. In some examples, one or more machine learned models may be trained to determine the point classifications and/or associated probabilities. In such examples, the machine learned model(s) may be trained utilizing annotated data (e.g., ground truth, training data). In at least one example, the first channel may be trained utilizing training data including camera annotated data (e.g., objects in images classified by a camera system) and the second channel may be trained utilizing training data including human annotated data (e.g., objects in the images classified manually by humans).

Though described herein as being associated with a probability that the object (including the point) includes the cloud of particulate matter, the false positive indication may additionally or alternatively be associated with a probability that the object includes a reflection or other detected object that may not impact driving behavior. For example, a first machine learned model representing the first channel may be trained to classify a point associated with a lidar blob as a reflection and a second machine learned model representing the second channel may be trained to determine a probability that point is associated with the reflection (e.g., probability of false positive associated with the classification).

In various examples, the first channel and the second channel may be configured to determine a point subclassification (e.g., open door of a vehicle, side car of a motorcycle, handicap ramp on a van, etc.) of an object and/or a probability that the point subclassification includes a false positive indication. In such examples, the first channel may be trained to identify the point subclassification and the second channel may be trained to determine the probability of the false positive utilizing the machine learning techniques described above.

In various examples, the vehicle computing system may be configured to generate a top-down representation of the environment based on the lidar data. In some examples, the vehicle computing system may generate the top-down representation utilizing the techniques described in U.S. patent application Ser. No. 16/151,607 filed Oct. 4, 2018 and entitled "Trajectory Prediction on Top-Down Scenes," U.S. patent application Ser. No. 16/504,147 filed Jul. 5, 2019 and entitled "Prediction on Top-Down Scenes based on Action Data," and in U.S. patent application Ser. No. 16/586,620 filed Sep. 27, 2019 and entitled "Supplementing Top-Down Predictions with Image Features," the entire contents of which are incorporated herein by reference.

In various examples, the vehicle computing system may generate the top-down representation based on lidar data from a single lidar sensor or by aggregating the lidar data from multiple lidar sensors. In such examples, the top-down representation may be based on the aggregated lidar data. In various examples, the vehicle computing system may aggregate the point classifications and/or probabilities that the point is associated with a cloud of particulate matter from each of the lidar sensors into the top-down representation. In some examples, the vehicle computing system may be configured to segment (e.g., box or otherwise identify) lidar blobs in the top-down representation. The segments (e.g., lidar segments) may represent the objects detected in the environment. In some examples, the lidar segments may have associated therewith the per-point probabilities of being associated with a cloud of particulate matter.

In various examples, the vehicle computing system may include a lidar segment classifier configured to process the top-down representation of the environment with the lidar segments and associated (aggregated) probabilities of being associated with a cloud of particulate matter to determine whether the object is associated with a cloud of particulate matter. In some examples, the lidar segment classifier may receive lidar segments with associated per-point probabilities above a threshold value (e.g., 45% (0.45), 50% (0.50), 60% (0.60), etc.). In such examples, lidar segments and/or lidar points (e.g., data points) corresponding to a low probability of being associated with the cloud of particulate matter may be filtered out. Additionally or in the alternative, the lidar segment classifier may be configured to determine classifications associated with unsegmented lidar data and a probability that the unsegmented lidar data includes particulate matter.

In various examples, the lidar segment classifier may be configured to determine a classification associated with each lidar segment in the top-down representation. In some examples, the lidar segment classifier may determine the classification utilizing lidar data and/or vision data (e.g., images representing the environment captured by camera sensors), as well as any additional sensor data (e.g., radar, sonar, etc.). In some examples, the lidar segment classifier may determine the classification based on confidence scores associated with the point classifications and/or probabilities associated therewith, the lidar segments in the top-down representation, classifications associated with the images (e.g., vision data), aggregated vision data, and the like.

The classification determined by the lidar segment classifier may include a cloud of particulate matter, car, person (e.g., head), bicycle, pylon, and/or clutter (e.g., unclassified segment). In various examples, the lidar segment classifier may determine a confidence associated with the classification. The confidence may represent a probability that the lidar segment is associated with the determined classification. In at least one example, the lidar segment classifier may determine a probability that a lidar segment is associated with a cloud of particulate matter. In such an example, the vehicle computing system may control the vehicle based on the classification and/or probability associated therewith.

In various examples, the vehicle computing system may be configured to determine whether a lidar segment corresponds to a previously determined track (e.g., movement over time) associated with a cloud of particulate matter. In some examples, the vehicle computing system may be configured to generate a track associated with a cloud of particulate matter. In various examples, the lidar segment may be associated with the track and/or the track may be generated based on a determination that the probability that the lidar segment is associated with a cloud of particulate matter meets or exceeds a threshold value (e.g., 55% (0.55), 60% (0.60), etc.). In various examples, the lidar segment may be associated with the track and/or the track may be generated based on a determination that the lidar segment includes a size associated with a lidar blob and/or that the lidar segment is active (e.g., dynamic, changes size, location, etc. over time). In at least one example, the determination that the lidar segment is active includes a determination that a location associated with at least one lidar point changes over time. In some such examples, associating the detected segment with a track previously determined to be associated with particulate matter may increase the confidence that the current detected segment is particulate matter. In those examples where there is no previous track associated, a new track may be created.

In various examples, the vehicle computing system may control the vehicle based on the probability that a lidar segment is associated with a cloud of particulate matter and/or a track associated therewith. In some examples, the vehicle computing system may determine to proceed through the lidar segment without modifying a vehicle trajectory, such as based on a probability of being associated with the cloud of particulate matter being above a threshold probability. In some examples, the vehicle computing system may determine to modify the vehicle trajectory (e.g., speed and/or direction of travel) based on the probability and/or track associated with the lidar segment. In some examples, the vehicle computing system may control the vehicle utilizing the techniques described in U.S. patent application Ser. No. 16/586,650 filed Sep. 27, 2019 and entitled "Planning Accommodations for Particulate Matter," the entire contents of which are incorporated by reference herein.

The techniques discussed herein can improve autonomous vehicle operation a number of ways. For instance, traditional autonomous vehicle controllers may rely heavily on lidar to detect and avoid objects in an environment. Particulate matter in the environment, such as generated by exhaust, steam, or environmental factors such as evaporation and sublimation, may generate returns on light beams associated with the lidar. The returns may cause the lidar to detect an object that may be otherwise unidentifiable to the autonomous vehicle controller. To avoid the unidentified object, the autonomous vehicle controller may cause the vehicle to brake and/or stop to avoid the object, which may result in unstable and/or inconsistent vehicle travel. Conversely, the techniques described herein provide an accurate means of determining a probability that a detected lidar blob (e.g., object) is associated with particulate matter, and control the vehicle based on the probability. As such, the techniques described herein result in improved control of the autonomous vehicle by making it more effective and efficient. Additionally, by relying on a probability based on many detected features in the environment, the vehicle computing system may enhance the safety associated with autonomous vehicle operation.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Additionally, the techniques described herein can be used with real data (e.g., captured using sensor(s)), simulated data (e.g., generated by a simulator), or any combination of the two.

FIG. 1 is an illustration of an example environment 100 in which one or more computing systems 102 of an autonomous vehicle 104 (e.g., vehicle 104) may classify one or more detected objects 106 (e.g., objects 106) as particulate matter 108 (e.g., region/cloud of particulate matter), in accordance with examples of the disclosure. The particulate matter may include steam (e.g., emitted from a man-hole cover, a dryer exhaust port, etc.), exhaust from a vehicle (e.g., car, truck, motorcycle, etc.), environmental gases (e.g., resulting from sublimation, fog, evaporation, etc.), a cloud of dust, water splashing, blowing leaves, or other types of particulate matter that may be located in the environment 100 and may not impact driving behavior (e.g., the autonomous vehicle 104 may safely pass through the particulate cloud without impact to the platform).

The vehicle 104 may detect the objects 106 based on sensor data captured by one or more sensors 110 of the vehicle 104. The sensor data captured by the sensor(s) 110 may include data captured by a lidar sensor, as well as data captured by other sensors such as camera sensors, radar sensors, time-of-flight sensors, sonar sensors, and the like. In at least one example, the sensor data may include lidar data comprising light signals reflecting off an object 106. In some examples, the light signals may reflect off a surface of the object 106. For example, the light signals may reflect off water molecules present in a cloud of particulate matter 108. For another example, the light signals may reflect off an outer surface of a car visible to the sensor.

In some examples, the sensor data may be provided to a perception component 112 configured to determine a classification associated with the object(s) 106 (e.g., car, truck, bicycle, motorcycle, pedestrian, particulate matter, navigable surface, free space, drivable surface, etc.). In various examples, the perception component 112 may receive lidar data associated with the object(s). In various examples, the lidar data may include a plurality of lidar points associated with light reflecting off the object(s) 106. In some examples, the lidar data may include data associated with lidar blobs (e.g., clusters of corresponding lidar points or voxels) representative of the object(s) 106. Of course, such a perception component 112 may be capable of performing operations on the plurality of points to create representations, segmentations, clusters, or the like associated with the object.

In various examples, the perception component 112 may receive lidar data from each lidar sensor of the vehicle 104. In some examples, the perception component 112 may be configured to perform semantic segmentation on the lidar data received from individual lidar sensors. In some examples, the perception component 112 may include a semantic segmentation component (e.g., semantic segmentation tool) configured to perform the semantic segmentation on lidar data. The semantic segmentation may comprise determining a point classification associated with each point of the lidar data (e.g., per point semantic class). The point classification may include a classification as a car, truck, bicycle, motorcycle, pedestrian, particulate matter, navigable surface, free space, drivable surface, or the like, associated with the point of the lidar data.

In various examples, the perception component 112 (via the semantic segmentation component) may be configured to determine a probability that one or more points of the lidar data are associated with particulate matter 108. In some examples, the probability that a point is associated with the particulate matter 108 may be based on a likelihood of a false positive indication that the point is associated with a material object 106 (e.g., car, pedestrian, bicyclist, or other object 106 that would impact driving behavior of the vehicle 104. In other words, the probability of being associated with particulate matter 108 may correspond to a likelihood that a particular point is not associated with a solid, material object 106. For example, a lidar point may be classified as a car and may include a corresponding 90% likelihood of being a false positive. Based on the high likelihood of including a false positive indication, the perception component 112 may determine that the point has a high probability of being associated with particulate matter 108. In some examples, the percent likelihood of being a false positive may correspond to a probability of being associated with particulate matter 108. For example, the 90% likelihood of being a false positive discussed in the example above may correspond to a 90% probability of being associated with particulate matter 108.

In at least one example, a first portion of the semantic segmentation component of the perception component 112 may be configured to determine classifications associated with lidar points and a second portion of the semantic segmentation component may be configured to determine the probability that the lidar points are associated with particulate matter 108. In such an example, the first portion may output a classification associated with lidar points and the second portion may output the probability that the lidar point is associated with particulate matter 108 (e.g., false positive indication).

In some examples, the perception component 112 may be trained utilizing machine learning techniques to determine the classification associated with each point and/or the probability that each point is associated with particulate matter 108, such as described in U.S. patent application Ser. No. 15/820,245 incorporated herein by reference above. In some examples, the first portion of the semantic segmentation component may be trained utilizing training data comprising system annotated data to determine classifications associated with lidar points. In some examples, the system annotated data may include camera data comprising one or more images of an environment captured by a camera. In some examples, the camera data may correspond to lidar data associated with the environment. In some examples, the system may be configured to automatically (e.g., without human input) classify the objects 106 included in the camera data and/or corresponding objects depicted in the lidar data.

In various examples, the second portion of the semantic segmentation component may be trained utilizing training data comprising human annotated data. The human annotated data may include lidar data and/or corresponding camera data that is manually annotated with classifications by a human. In such examples, the second portion providing the probability that the lidar points are associated with particulate matter 108 may be trained utilizing different training data from the first portion. In other examples, the second portion may be trained utilizing the same training data as that used to train the first portion. In various examples, the first portion and the second portion may be trained substantially simultaneously. In some examples, the first portion and the second portion may be trained utilizing data associated with a same environment. For example, the first portion and the second portion may be trained utilizing sensor data captured in a same environment, with the first portion trained utilizing training data including system annotated data and the second portion trained utilizing training data including human annotated data.

In various examples, the perception component 112 may be configured to generate a top-down representation of the environment 100 based on the sensor data. The top-down representation may include a two-dimensional birds-eye view of the environment 100 (illustrated in FIG. 2). In some examples, the top-down representation may be generated by a top-down segmentation component of the perception component 112. In some examples, the top-down representation may be generated utilizing the techniques described in the U.S. Patent Applications incorporated herein above. In various examples, the perception component 112 may aggregate lidar data from multiple lidar sensors into a single representation of the environment 100 (e.g., single spin) to generate the top-down representation. In various examples, the perception component 112 may be configured to align a metaspin (e.g., aggregated lidar data from multiple lidar sensors) to an aggregation of past metaspins. In such examples, the metaspins may include a plurality of lidar data points. In some examples, the plurality of lidar data points may be projected into a voxel grid (e.g., 3-dimensional representation of the environment 100).

In some examples, the perception component 112 may aggregate the classifications and probabilities associated with each lidar point into the top-down representation. In various examples, the top-down representations may include one or more lidar segments 114. In various examples, the lidar segment(s) 114 may be associated with lidar blobs and/or the object(s) 106. For example, a first lidar blob associated with object 106(1) may have associated therewith lidar segment 114(1), a second lidar blob associated with object 106(2) may have associated therewith lidar segment 114(2), and so on. In various examples, the lidar segment(s) 114 may be associated with dynamic voxels (e.g., voxels in the voxel grid including dynamic objects). In various examples, the perception component 112 may raytrace and/or tag the dynamic voxels in the voxel grid. In some examples, the perception component 112 may be configured to generate one or more lidar segments 114 for connected components (e.g., one or more small objects (e.g., small lidar groups, blobs, etc.) that are not identified as having a particular classification, such as based on the per-point classification.

In various examples, the lidar segment(s) 114 may include an aggregated probability that the corresponding object 106 is associated with particulate matter 108. In such examples, the perception component 112 may aggregate the probabilities associated with each point of the corresponding lidar blob to determine the aggregated probability. As used herein, the aggregated probability may represent an overall probability that a particular lidar segment and/or an object 106 (lidar blob) associated therewith includes particulate matter 108. As discussed above, in some examples, the probability that a particular lidar point is associated with particulate matter 108 may be represented by a likelihood of a false positive indication that the particular lidar point is associated with a material object. In such examples, the aggregated probability may represent an aggregated likelihood of multiple false positive indications.

In various examples, the perception component 112 may be configured to determine classifications associated with the lidar segment(s) 114. In some examples, a classification associated with a lidar segment 114 may represent a classification associated with the corresponding object 106. In at least one example, the perception component 112 may include one or more lidar segment classifiers configured to determine classifications associated with lidar segment(s) 114. In some examples, the classifications may include a head (e.g., of a pedestrian), a bicycle, a car, such as objects 106(3) and 106(4) corresponding to lidar segments 114(3) and 114(4), a pylon, particulate matter 108, such as objects 106(1) and 106(2) corresponding to lidar segments 114(1) and 114(2), and clutter (e.g., unclassified matter).

In some examples, a lidar segment classifier of the perception component may be configured to determine whether a lidar segment 114 is associated with particulate matter 108. In such examples, the lidar segment classifier may receive data associated with one or more lidar segment(s) 114. In some examples, based on a determination that an aggregated probability associated with the lidar segments(s) 114 meets or exceeds a threshold probability, the lidar segment classifier may determine whether the lidar segment 114 is associated with particulate matter 108. For example, the lidar segment classifier may receive data corresponding to lidar segments 114(3) and 114(4) and corresponding low aggregated probabilities of being associated with particulate matter 108. Based on the low aggregated probabilities, the lidar segment classifier may ignore the particulate matter classification in determining classifications associated with the lidar segments 114(3) and 114(4). For another example, the lidar segment classifier may receive data corresponding to lidar segments 114(1) and 114(2) and corresponding high aggregated probabilities of being associated with particulate matter 108. Based on the high aggregated probabilities, the lidar segment classifier may process data to determine a final probability that the lidar segments 114(1) and 114(2) are associated with particulate matter 108(1) and 108(2). The final probability may or may not correspond to the aggregated probability.

In various examples, the perception component 112 (lidar segment classifier) may determine the final probability that the lidar segment(s) 114 (and corresponding object(s) 106) are associated with particulate matter 108 based on lidar data and vision data (e.g., data associated with images captured by camera sensors, image data, etc.). In such examples, the lidar data and the vision data may correspond to the same environment 100 (e.g., include the same objects 106). In various examples, perception component 112 may be configured to generate a per-pixel classification of the images. In some examples, the per-pixel classification may be generated utilizing semantic segmentation of the image, such as by a semantic segmentation component configured to process vision data. In various examples, the perception component 112 may aggregate the vision per-pixel classifications and project (and/or otherwise fuse) the vision classifications into (with) associated lidar segments (e.g., paint points with the associated vision-based classifications). In various examples, the final probability that the lidar segment(s) 114 are associated with particulate matter 108 may be based in part on the vision-based classifications. In such examples, the lidar segment classifier may receive the vision-based classifications from the semantic segmentation component configured to process vision data. Similar processes may be used to incorporate information from one or more additional sensor modalities (e.g., radar, sonar, etc.). In various examples, the final probability (and/or classification of an object 106 as particulate matter) may be determined based on data received from a long wave infrared sensor. In such examples, sensor data associated with the long wave infrared sensor may be utilized to determine a probability (and/or classification) of a detected object 106.

In some examples, the final probability that the lidar segment(s) 114 are associated with particulate matter 108 may be based on one or more semantic segmentation confidence scores. The semantic segmentation confidence score(s) may represent a confidence that a semantic segmentation component and/or the perception component 112 has in the validity of the point classifications (e.g. lidar and/or vision-based classification) and/or probabilities associated therewith. In some examples, the final probability may be based on a confidence score associated with the top-down representation. The confidence score associated with the top-down representation may include a confidence that the environment 100 and/or lidar segment(s) 114 are represented accurately in the top-down representation. In some examples, the confidence score may represent an accuracy of aggregation of the lidar data captured by two or more sensors and/or an accuracy of aggregation of the probabilities that a lidar point is associated with particulate matter 108.

In various examples, the final probability that the lidar segment(s) 114 are associated with particulate matter 108 may be based on one or more features associated with the object(s) 106 corresponding to the lidar segment(s) 114. The features may include a size of the object 106 (e.g., width, height, depth, etc.), shape (e.g., geometry, symmetry, etc.), a location of the object 106 (e.g., proximity to a surface, height above the surface, etc.), a track of the object 106 (e.g., movement over time, speed, direction, etc.), proximity to another object 106, an overlap of two or more lidar segments 114, proximity to a location on another vehicle (e.g., location associated with exhaust, etc.), or the like. For example, the perception component 112 may recognize the shapes, and sizes, and tracks of associated with objects 106(3) and 106(4) and may determine that the objects 106(3) and 106(4) are cars. For another example, the perception component 112 may determine that the shapes, locations, sizes, and tracks associated with objects 106(1) and 106(2) are those associated with clouds of particulate matter 108(1) and 108(2).

Additionally, the perception component 112 may be configured to process data associated with lidar segment 116 and determine whether the lidar segment 116 is associated with particulate matter 108(3) (e.g., classification thereof includes particulate matter 108 and associated probability). The lidar segment 116 may represent lidar blobs that are not in proximity to another object 106 (e.g., standalone segments, objects, etc.). The perception component 112 may generate the lidar segment 116 based on the size, shape, movement, confidence in the lidar data (e.g., detected by a malfunctioning lidar sensor), or the like.

In various examples, the classification and/or final probability that the lidar segment 116 is associated with particulate matter 108(3) may be determined based on the per-point and/or per-pixel classifications, such as those determined by a semantic segmentation component, as described above. In some examples, the classification and/or probability that the lidar segment 116 is associated with particulate matter 108(3) may be determined based on a false positive score associated with the per-point and/or per-pixel classification (e.g., probability that point and/or pixel is associated with particulate matter 108). In various examples, the classification and/or probability that the lidar segment 116 is associated with particulate matter 108(3) may be based on confidence associated with the lidar and/or vision-based semantic segmentation, as described above. In some examples, the classification and/or probability that the lidar segment 116 is associated with particulate matter 108(3) may be based on features associated with the lidar segment 116. In the illustrative example, the lidar segment 116 may include multiple small objects in the shape of leaves. The leaves may be located apart from one another such that the space in between two leaves does not have associated lidar returns (no reflected light). Due in part to the small size of the leaves and the spaces in between not registering lidar returns, the leaves may be too small and/or not an appropriate shape to be segmented. The size and/or shape (and/or other features) associated with the leaves may cause the perception component 112 to classify the lidar segment 116 as a cloud of particulate matter 108(3), with an 80% probability, for example.

In various examples, based on a determination that the final probability is above the threshold probability, the perception component 112 may determine whether the lidar segment 114 and/or 116 is associated with an existing particulate matter track 120 (e.g., track 120). A determination that the lidar segment 114 and/or 116 is associated with an existing particulate matter track 120 may be based on a distance between lidar blobs, a proximity to an object, such as objects 106(3) and 106(4), and speeds associated with the objects 106(3) and 106(4) (e.g., movement over time), and/or any other features associated with the object and track 120. Based on a determination that the lidar segment 114 and/or 116 is associated with an existing particulate matter track 120, the perception component 112 may associate lidar segment 114 and/or 116 with the track 120.

Based on a determination that the lidar segment 114 and/or 116 is not associated with an existing particulate matter track 120, the perception component 112 may be configured to generate a particulate matter track 120 (e.g., track 120) associated with the lidar segment 114 and/or 116. In various examples, the perception component 112 may generate the track 120 based on a determination that the lidar segment 114 and/or 116 includes a size associated with the associated lidar blob and that the lidar segment 114 and/or 116 is active (e.g., dynamic, changing over time). A determination that the lidar segment 114 and/or 116 is active may be based on a comparison of data associated therewith between lidar spins (e.g., metaspin of the lidar system). In at least one example, the determination that the lidar segment 114 and/or 116 is active includes a determination that a location associated with at least one lidar point changes over time (e.g., a lidar point or group of lidar points moves in the environment, such as in a way that water particles associated with steam, exhaust, fog, etc. move). In some examples, the determination that the lidar segment 114 and/or 116 is active may be based on the movement associated with the lidar point or group of lidar points. In such examples, the movement may include a distance traveled over time (e.g., between metaspins), fluidity of movement of one or more groups of lidar points, or the like. In various examples, the perception component 112 may be configured to generate and/or associate particulate matter 108 data with the track 120 periodically (e.g., every 50 milliseconds, 100 milliseconds, etc.), such as with each lidar spin. In at least one example, the perception component 112 may generate and/or associate particulate matter 108 data with the track 120 with every metaspin at a frequency of 100 milliseconds.

In various examples, the computing system(s) 102 may include a planning component 118 configured to process the classifications and/or probability (e.g., final probability) that lidar segments 114 and/or 116 are associated with particulate matter 108 and determine an action for the vehicle 104 to take. In some examples, the planning component 118 may be configured to receive a top-down representation of the environment 100 from the perception component 112 including probabilities that each lidar segment 114 and/or 116 is associated with particulate matter 108. In some examples, the perception component 112 may additionally or alternatively provide an indication that a lidar segment 114 and/or 116 is associated with particulate matter. In some examples, the determination of associated with particulate matter may be based on the probability being above a threshold probability (e.g., 65%, 75%, etc.).

In various examples, the planning component 118 may be configured to determine the action to take based on the track 120 and/or the probability that the lidar segment 114 and/or 116 is associated with particulate matter 108. The action may include maintaining a course and speed (e.g., the vehicle trajectory) associated with a path of the vehicle 104, slowing the vehicle 104 to a predetermined speed (e.g., 10 miles per hour, 20 kilometers per hour, etc.), stopping the vehicle 104, changing lanes, and/or adjusting a position in a lane. In various examples, the planning component 118 may determine one or more trajectories for the vehicle 104 to travel based on the action.

In various examples, the action may be determined based on the probability being above and/or below one or more threshold probabilities. In some examples, the threshold(s) may be associated with various levels of probability, such as high probability, medium probability, low probability, and the like. In some examples, each level of probability (e.g., probability above/below different thresholds) may have associated therewith one or more actions. For example, based on a determination that there is a high probability that a lidar segment 114(2) is associated with a region of particulate matter 108(2) (e.g., probability at or above a first threshold), the planning component 118 may determine that the action includes maintaining a course and speed (e.g., maintain a trajectory) of the vehicle 104. For another example, based on a determination that there is a low probability that the lidar segment 114(2) is associated with a region of particulate matter 108(2) (e.g., probability at or below a second threshold), the planning component 118 may determine that the action includes stopping the vehicle 104. For yet another example, based on a determination that there is a medium probability that the lidar segment 114(2) is associated with a region of particulate matter 108(2) (e.g., probability at or below the first threshold and at or above the second threshold), the planning component 118 may determine to slow the vehicle to a pre-determined speed (e.g., 15 kilometers per hour, 9 miles per hour, etc.).

In various examples, the planning component 118 may be configured to determine an action for the vehicle 104 utilizing the techniques described in U.S. patent application Ser. No. 16/586,650, incorporated by reference herein above. In various examples, the planning component 118 may receive top-down representations including classifications and/or probabilities that lidar segment(s) 114 and/or 116 are associated with particulate matter 108 periodically (e.g., every 0.05 seconds, 0.1 second, 0.5 seconds, etc.) In various examples, the planning component 118 may receive the top-down representations responsive to sending a request to the perception component for data associated with particulate matter 108. For example, a planning component 118 of a parked vehicle may request data from the perception component 112 based on an indication that the vehicle 104 is planning to start moving (e.g., within a threshold time from departing a parking location). In such examples, the planning component may request that the perception component 112 start processing sensor data to detect and classify clouds of particulate matter 108 and/or other objects 106 associated with material objects that may impact vehicle operation.

Figure 2:
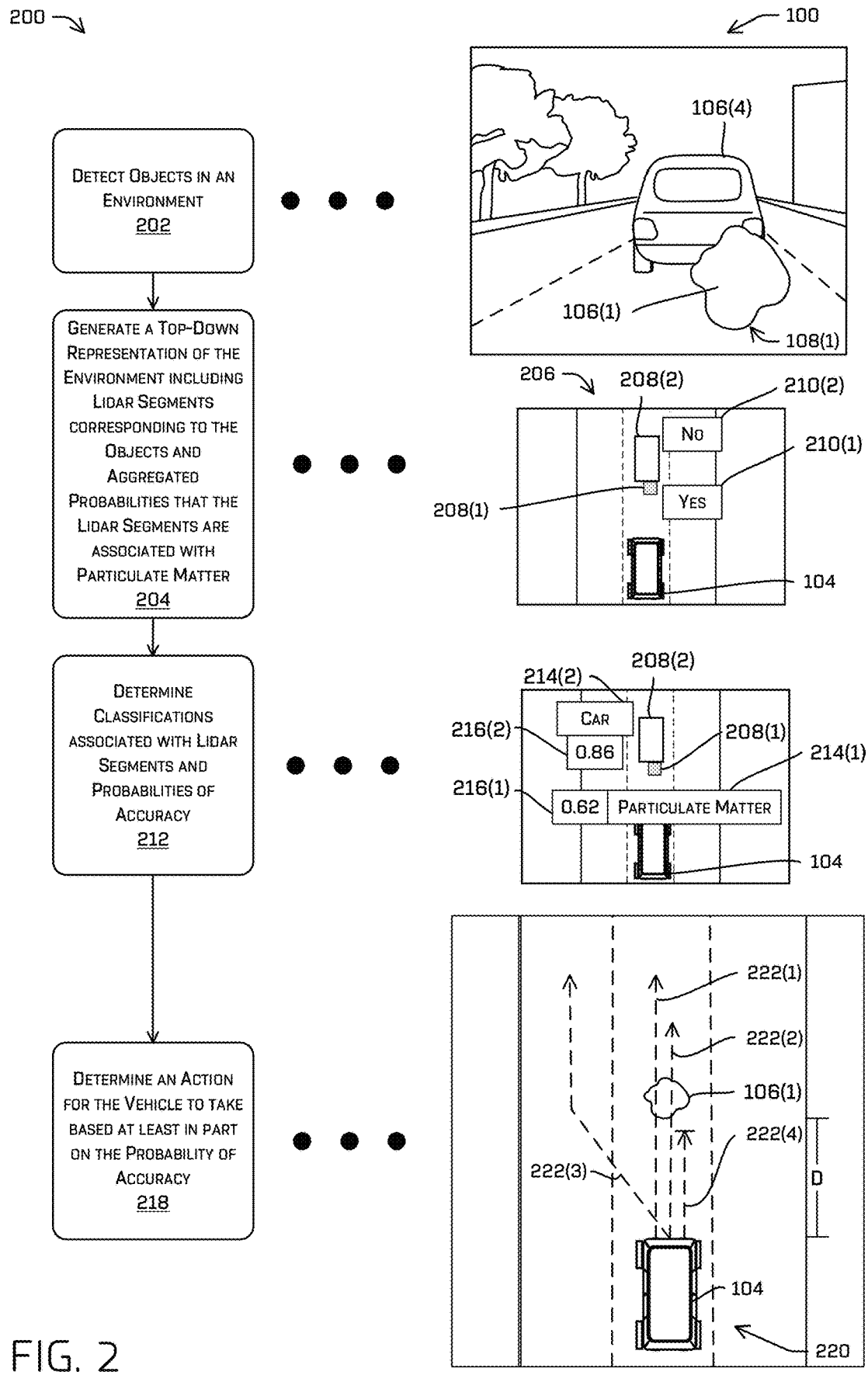
FIG. 2 is an example process for determining a probability that an object in a path of the vehicle is classified as particulate matter, in accordance with examples of the disclosure.

FIG. 2 is an example process 200 for determining a probability that an object 106(1) in a path of the vehicle 104 is classified as particulate matter 108(1), in accordance with examples of the disclosure.

An operation 202 includes detecting objects 106(1) and 106(4) in an environment 100. In various examples, the objects 106(1) and 106(4) may be detected based on data captured from one or more sensors. The sensor data captured by the sensor(s) may include data captured by a lidar sensor, as well as data captured by other sensors such as camera sensors, radar sensors, time-of-flight sensors, sonar sensors, and the like. In at least one example, the sensor data may include lidar data comprising light signals reflecting off the objects 106(1) and 106(4). In some examples, the light signals may reflect off water molecules present in a region of particulate matter 108(1). The objects 106(1) and 106(4) may be represented by lidar blobs, as described above.

In various examples, a vehicle computing system, such as computing system(s) 102, may be configured to perform semantic segmentation on the sensor data. In some examples, the vehicle computing system may be configured to perform semantic segmentation on sensor data captured by one or more cameras (e.g., vision data). In some examples, the vehicle computing system may be configured to perform semantic segmentation on sensor data captured by lidar sensors (e.g., lidar data). The semantic segmentation may include a per-point (lidar data) and/or per-pixel (vision data) classification of sensor data corresponding to detected objects 106(1) and 106(4). For example, a lidar sensor may receive light reflecting off water molecules in object 106(1) (e.g., lidar points) and may determine a classification associated with each lidar point. The point classification may include a classification as a car, truck, bicycle, motorcycle, pedestrian, particulate matter, navigable surface, free space, drivable surface, or the like, associated with the point of the lidar data.

In various examples, the semantic segmentation may include determining a per-point and/or per-pixel probability that each point and/or pixel is associated with a cloud of particulate matter 108(1). In some examples, the probability that a point is associated with the particulate matter 108(1) may be based on a likelihood of a false positive indication that the point is associated with a material object 106(4) (e.g., car, pedestrian, bicyclist, or other object 106 that would impact driving behavior of the vehicle 104).

In at least one example, a semantic segmentation component of the vehicle computing system may be configured to output a first channel associated with classifications associated with lidar points and a second channel associated with the probability that the lidar points are associated with particulate matter 108(1). In various examples, a first portion and a second portion of the segmentation component configured to output the first channel and the second channel, respectively, may be trained utilizing machine learning techniques. In some examples, the first portion may be trained utilizing training data including computer system annotated, such as data annotated by a computing system (e.g., without human input), and the second portion may be trained utilizing training data including manually annotated data, such as lidar data annotated based on human input.

An operation 204 may include generating a top-down representation 206 of the environment 100 including lidar segments 208(1) and 208(2), such as lidar segments 114(1) and 114(4), corresponding to the objects 106(1) and 106(4) and aggregated probabilities 210(1) and 210(2) (e.g., aggregated probabilities 210(1) and 210(2)) that the lidar segments 208(1) and 208(2) are associated with particulate matter 108(1). In the illustrative example, the top-down representation 206 may include data representative of the vehicle 104. In other examples, the top-down representation may not include data representative of the vehicle 104.

In some examples, the vehicle computing system may be configured to aggregate lidar data received from each lidar sensor to generate the top-down representation 206. In such examples, the top-down representation 206 may include an aggregation of lidar data from each of the lidar sensors. In various examples, the vehicle computing system may be configured to generate the lidar segments 208(1) and 208(2) based on the aggregated lidar data. In some examples, a size and/or shape of the lidar segments 208(1) and 208(2) may correspond to the size and/or shape of lidar blobs (e.g., groups of adjacent lidar points) represented in the aggregated lidar data. In some examples, a detection and/or classification associated with the lidar blobs may be determined independently of the lidar segments 208(1) and 208(2). In various examples, the lidar segments 208(1) and 208(2) may be sized (e.g., length, width, etc.) to substantially contain the lidar points associated with corresponding lidar blobs.

In various examples, the vehicle computing system may be configured to aggregate the per-point classification of each lidar point and/or associated probabilities that the points are associated with particulate matter 108(1). In some examples, the vehicle computing system may determine aggregated probabilities 210(1) and 210(2) that the lidar segments 208(1) and 208(2) are associated with particulate matter 108(1). The aggregated probabilities 210(1) and 210(2) may represent an overall probability that the lidar segment 208(1) and 208(2) and/or corresponding objects 106(1) and 106(4) (lidar blobs) include particulate matter 108(1). As discussed above, in some examples, the probability that a particular lidar point is associated with particulate matter 108(1) may be represented by a likelihood of a false positive indication that the particular lidar point is associated with a material object, such as object 106(4) (e.g., car). In such examples, the aggregated probabilities 210(1) and 210(2) may represent an aggregated likelihood of multiple false positive indications.

In the illustrative example of FIG. 2, the aggregated probabilities 210(1) and 210(2) include a binary determination of association with particulate matter 108(1) (e.g., yes or no). In some examples, the binary determination may be based on a determination that associated aggregated probabilities 210(1) and 210(2) are above a threshold probability (e.g., 50%, 60%, etc.). In some examples, the aggregated probabilities 210(1) and 210(2) may include an aggregated percentage or value (e.g., between 0 and 1) associated with the probability that the corresponding lidar segment 208(1) or 208(2) is associated with particulate matter 108(1). In such examples, the aggregated probabilities 210(1) and 210(2) may be determined based on an average (e.g., mean, median, mode, etc.) value of the per-point probabilities. For example, the aggregated probability 210(2) may be represented by a numerical value (e.g., 0.1), or a percentage value (e.g., 10%) representative of a low probability of being associated with particulate matter 108(1). For another example, the aggregated probability 210(1) may be represented by a numerical value (e.g., 0.9), or a percentage value (e.g., 90%) representative of a high probability of being associated with particulate matter 108(1).

An operation 212 may include determining classifications 214(1) and 214(2) associated with the lidar segments 208(1) and 208(2) and corresponding probabilities of accuracy 216(1) and 216(2). The probabilities of accuracy 216(1) and 216(2) may represent a probability that the corresponding classifications 214(1) and 214(2) are accurate.

In various examples, the vehicle computing system may include a lidar segment classifier configured to determine the classifications 214(1) and 214(2) and corresponding probabilities of accuracy 216(1) and 216(2) associated with the lidar segments 208(1) and 208(2). In at least one example, the classifications 214(1) and 214(2) may include a head (e.g., associated with a pedestrian), a car, a bicycle, a pylon, particulate matter 108(1), and clutter (e.g., unclassified matter). For the purposes of this discussion, the probability of accuracy 216(1) associated with the lidar segment 208(1) corresponds to a final probability that the lidar segment 208(1) is associated with particulate matter, such as represented by classification 214(1). As such, the probability of accuracy 216(1) may additionally be referred to as the final probability 216(1) that the lidar segment 208(1) includes particulate matter 108(1) (e.g., final probability 216(1)).

In various examples, the vehicle computing system may be configured to determine a final probability 216(1) that a lidar segment 208(1) is associated with particulate matter 108(1). In some examples, the vehicle computing system may determine the final probability 216(1) based on a determination that the aggregated probability 210(1) associated with the lidar segment 208(1) is above a threshold probability. For example, the vehicle computing system may determine whether lidar segment 208(1) includes the classification 214(1) as particulate matter and the final probability 216(1) based on the aggregated probability 210(1) being above a threshold probability.

In various examples, the vehicle computing system may determine the final probability 216(1) that the lidar segment 208(1) is associated with particulate matter 108(1) based on lidar data and vision data (e.g., data associated with images captured by camera sensors, image data), in addition to any other data available. In such examples, the lidar data and the vision data may correspond to the same environment 100 (e.g., include the same objects 106(1) and 106(4)). In various examples, vehicle computing system may determine the final probability 216(1) based on per-point and/or per-pixel classifications and probabilities determined utilizing semantic segmentation, such as aggregated probability 210(1) that a lidar segment 208(1) and/or object 106(1) is associated with particulate matter.

In some examples, the final probability 216(1) may be determined based on one or more semantic segmentation confidence scores. The semantic segmentation confidence score(s) may represent a confidence that a semantic segmentation component has in the validity of the point classifications (e.g. lidar and/or vision-based classification) and/or probabilities associated therewith. In some examples, the final probability 216(1) may be based on a confidence score associated with the top-down representation 206. The confidence score associated with the top-down representation 206 may include a confidence that the environment 100 and/or lidar segment(s) 208(1) and 208(2) are represented accurately in the top-down representation 206. In some examples, the confidence score may represent an accuracy of aggregation of the lidar data captured by two or more sensors and/or an accuracy of aggregation of the probabilities that a lidar point is associated with particulate matter 108.

In various examples, the final probability 216(1) may be based on one or more features associated with the object 106(1) corresponding to the lidar segment 208(1). The features may include a size of the object 106(1) (e.g., width, height, depth, etc.), shape (e.g., geometry, symmetry, etc.), a location of the object 106(1) (e.g., proximity to a surface, height above the surface, etc.), a track of the object 106(1) (e.g., movement over time, speed, direction, etc.), proximity to another object 106(1), an overlap of lidar segments 208(1) and 208(2), a distance between lidar segments 208(1) and 208(2) and/or objects 106(1) and 106(2), proximity to a location on another vehicle (e.g., location associated with exhaust, etc.), or the like. For example, the vehicle computing system may recognize the shape and size of the objects 106(1) and may determine that the size and shape are those associated with a cloud of particulate matter 108(1). The final probability 216(1) may be based at least in part on the determination that the size and shape are associated with the cloud of particulate matter 108(1).

In various examples, the vehicle computing system may be configured to determine whether the cloud of particulate matter 108(1) is associated with an existing particulate matter track, such as track 120. A determination that the cloud of particulate matter 108(1) is associated with an existing particulate matter track may be based on a distance between lidar blobs, a proximity to an object, speeds associated with the object 106(1) (e.g., movement over time), and the like. Based on a determination that the cloud of particulate matter 108(1) is associated with an existing particulate matter track, the vehicle computing system may associate the the cloud of particulate matter 108(1) with the track.

Based on a determination that the cloud of particulate matter 108(1) is not associated with an existing particulate matter track, the vehicle computing system may be configured to generate a particulate matter track associated with the cloud of particulate matter 108(1). In various examples, the vehicle computing system may generate the track based on a determination that the cloud of particulate matter 108(1) includes a size associated with the associated lidar blob and that the cloud of particulate matter 108(1) is active (e.g., dynamic, changing over time, etc.). A determination that the cloud of particulate matter 108(1) is active may be based on a comparison of data associated therewith between lidar spins (e.g., metaspin of the lidar system). In various examples, the vehicle computing system may be configured to generate and/or associate particulate matter data with particulate matter tracks periodically (e.g., every 50 milliseconds, 100 milliseconds, etc.), such as with each lidar spin. In at least one example, the vehicle computing system may generate and/or associate particulate matter data with particulate matter tracks with every metaspin at a frequency of 100 milliseconds.

An operation 218 may include determining an action 222 for the vehicle 104 to take based at least in part on the probability of accuracy. Additionally, the action 222 may be determined based on the track associated with the cloud of particulate matter 108(1). In various examples, the vehicle computing system may determine a trajectory (e.g., initial trajectory, first trajectory, etc.) of the vehicle 104, such as determined at a time associated with an initial position 220. The initial trajectory may include a direction of travel and speed (or speeds) associated with the vehicle traveling through the environment, such as along a path to a destination. In various examples, the action 222, such as first action 222(1), may include maintaining the initial trajectory. In some examples, the vehicle computing system may cause the vehicle to perform the first action 222(1) based on a determination that the final probability 216(1) is above a first threshold probability (e.g., 95%, 98%, etc.). In such examples, the vehicle computing system may determine that, due to the high probability that the detected object 106(1) comprises particulate matter 108(1), the vehicle 104 may be able to safely proceed along the initial trajectory to a destination.

In various examples, the action 222, such as actions 222(2), 222(3), and 222(4) may include modifying the trajectory to a second (modified) trajectory. In the illustrative example, a second action 222(2) includes modifying the trajectory by reducing a speed associated therewith (e.g., as compared to the initial trajectory). In various examples, the modified (or second) speed associated with the modified trajectory may include a pre-determined speed (e.g., 9 miles per hour, 15 kilometers per hour, etc.). In such examples, the pre-determined speed may be associated with a safety protocol for vehicle operations, thereby ensuring maximizing safety for the vehicle, vehicle occupants, and others operating in the environment 100. In some examples, the speed associated with the modified trajectory may be dynamically determined based on one or more factors. The factors may include vehicle 104 speed, speed limit associated with environment 100, a number of detected objects, classifications associated with the detected of objects, weather (e.g., rain, snow, fog, etc.), an area or zone associated with the environment 100 (e.g., school zone, residential area, construction zone, etc.), or the like. In such examples, the vehicle computing system may determine a safe speed at which to approach the object 106(1) in the environment 100, thereby ensuring safe operations in any condition (e.g., different environments, weather, etc.). For example, the vehicle computing system may detect the object 106(1) and determine that the vehicle 104 is in a school zone. Based on the school zone, the vehicle computing device may cause the vehicle to slow to 7 miles per hour, to allow the vehicle to continue forward progress, but be capable of stopping in a very short distance, if necessary for safety reasons.

In some examples, the vehicle computing system may determine to perform one or more of the second action 222(2), the third action 222(3), and/or the fourth action 222(4) based on a cost analysis, such as that described in U.S. patent application Ser. No. 16/586,650, incorporated by reference herein above. In such examples, the vehicle computing system may calculate a cost (e.g., safety cost, comfort cost, progress cost, and/or operational rules cost, etc.) associated with each action and may select a lowest-cost action to perform. In some examples, the vehicle computing system may select an action 222 for the vehicle 104 to take based at least in part on cost optimization.

In various examples, the vehicle computing system may determine to perform the second action 222(2) based on a determination that the final probability 216(10 is less than the first threshold probability. In some examples, the second action 222(2) may be performed responsive to a determination that the probability is less than the first threshold probability and greater than or equal to a second threshold (e.g., 50%, 60%, etc.). In such examples, the vehicle computing may cause the vehicle 104 to slow based on a determination that a medium probability exists that the object 106(1) is associated with particulate matter 108(1).

In various examples, the vehicle computing system may determine to perform the second action 222(2) based in part on a distance (D) between the vehicle 104 and the object 106(1). In some examples, based on a determination that the distance (D) is above a threshold distance (e.g., 100 feet, 100 meters, etc.), the vehicle computing system may cause the vehicle 104 to perform the second action 222(2). In such examples, the vehicle computing system may be configured to gather additional data with respect to the object 106(1) to determine an updated probability that the object 106(1) is associated with particulate matter 108(1). In some examples, the vehicle computing system may determine a high confidence, based on the updated probability, that the object 106(1) is associated with particulate matter 108(1). Based on the updated probability, the vehicle computing system may cause the vehicle 104 to resume the initial trajectory and/or determine an updated trajectory for the vehicle 104 to travel through the environment 100 to the destination. For example, the vehicle computing system may determine that the updated trajectory is above the first threshold probability and may cause the vehicle to accelerate to a speed associated with the initial trajectory and/or another trajectory associated with vehicle 104 progressing to the destination.

In various examples, the action 222, such as action 222(3) may include modifying a direction and/or speed associated with the vehicle trajectory. Though illustrated as a lane change, the third action 222(3) may include any other safe lateral maneuver to permit navigation around the object 106(1), such as modifying a position in a lane, partially or completely operating on a shoulder of the road, or the like. In some examples, the vehicle computing system may cause the vehicle 104 to perform the third action 222(3) based on a probability being below the first threshold probability. In some examples, the third action 222(3) may be selected based on the probability being below the first threshold and above a second threshold. In such examples, the vehicle computing system may cause the vehicle to perform the third action 222(3) based on a medium probability that the object 106(1) is associated with the region of particulate matter 108(1). In some examples, the vehicle computing system may determine to perform the third action 222(3) based on a probability being below the second threshold (e.g., low probability of being associated with particulate matter 108). In such examples, the vehicle computing system may determine to move away from the object 106(1), such as to avoid a collision therewith. Of course, though described in terms of thresholds herein, this is not meant to be so limiting. For instance, while some examples may set fixed thresholds for decision-making, it should be understood that any discussion of thresholds herein may also refer to cost expressions set up in such a way such that a transition occurs between two outcomes based on an optimization over the cost at or about such a threshold. In various examples, combinations of hard constraints (e.g., fixed threshold for decisions), as well as thresholds as representing transitions in a cost-optimization are contemplated.

In various examples, the vehicle computing system may cause the vehicle 104 to modify the initial trajectory to stop the vehicle 104 prior to a location associated with the object 106(1), such as depicted in FIG. 2 as a fourth action 222(4). In some examples, a determination to perform the fourth action 222(4) may be based on a probability being below a second (or low) threshold (e.g., 25%, 10%, etc.). In such examples, based on a determination that there is a low probability that the object 106(1) is associated with the region of particulate matter 108(1), the vehicle computing system may cause the vehicle 104 to stop prior to a location associated with the object 106(1).

The vehicle computing system may select the action 222 based on safety considerations for the occupants of the vehicle 104 and/or others present in the environment 100 (e.g., passengers of other vehicles, etc.). As such, the techniques described herein may greatly improve the safety of autonomous vehicle operations.

Figure 3:
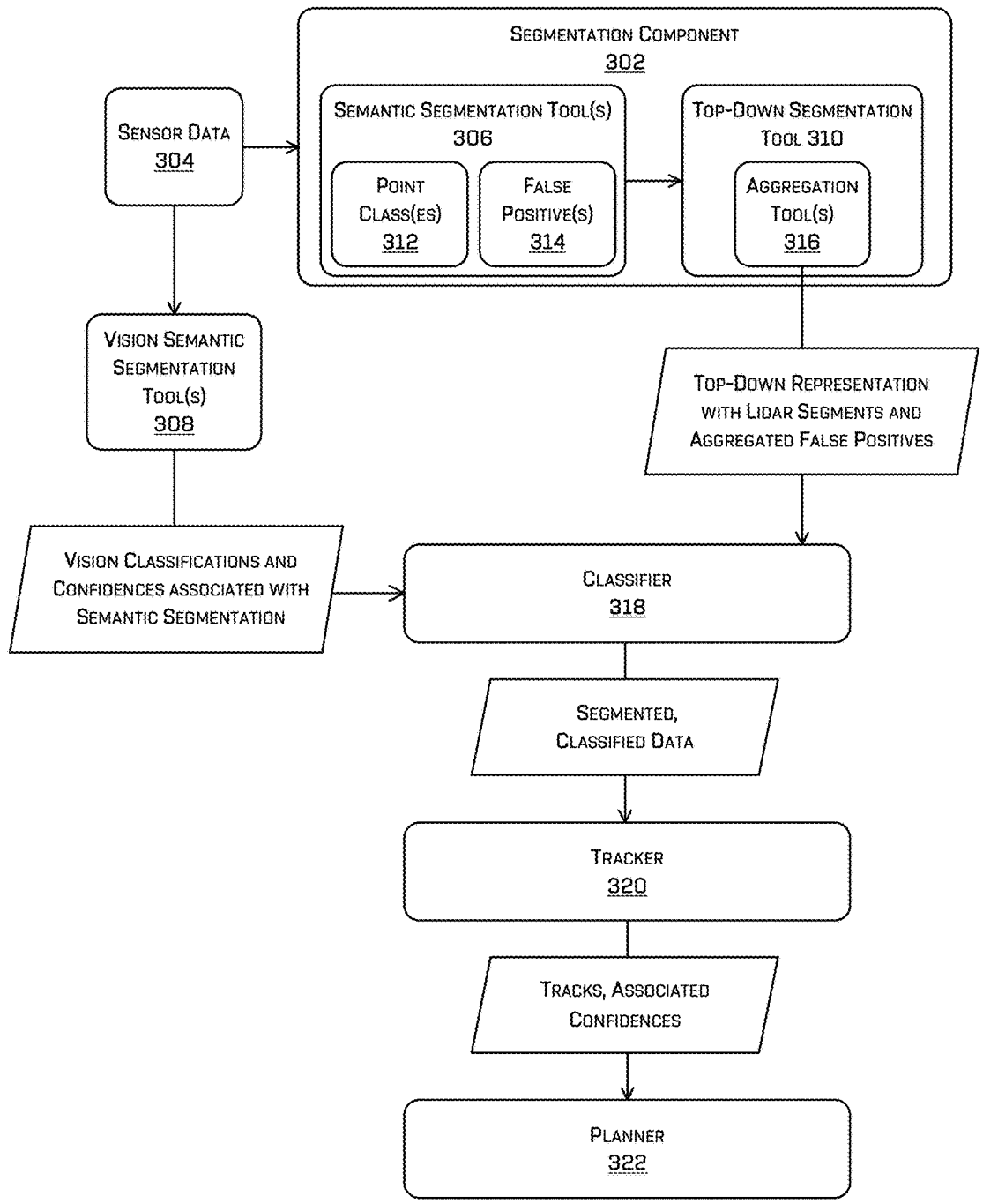
FIG. 3 depicts a flow diagram for determining a classification of an object as particulate matter.

FIG. 3 depicts an example block diagram 300 illustrating a flow for determining a classification of an object as particulate matter. In various examples, a segmentation component 302 of a vehicle computing system may receive sensor data 304 from one or more sensors of a vehicle. The sensor data may include data received from lidar sensors, camera sensors, radar sensors, time-of-flight sensors, sonar sensors, and the like.

In various examples, the segmentation component 302 may include one or more semantic segmentation tools 306 and a top down segmentation tool 310. In some examples, the semantic segmentation tool(s) 306 may include lidar semantic segmentation tool(s) 306. The semantic segmentation tool(s) 306 may be configured to receive and process the sensor data to determine classifications of objects represented therein. In some examples, the semantic segmentation tool(s) 306 may receive lidar data and may determine a per-point classification 312 (point class 312) associated with lidar points located therein, as discussed above. Additionally, the semantic segmentation tool(s) 306 may determine a false positive indication 314 (false positive(s) 314) associated with the per-point classification 312. In such examples, the false positive indication 314 may represent a probability that the lidar point is associated with particulate matter (e.g., not associated with a material object). For the purposes of this discussion, the false positive indication 314 may represent the probability that a lidar point is associated with particulate matter, as described above.

In various examples, the semantic segmentation tool(s) 306 may be configured to determine one or more confidences associated with the per-point classifications 312 and/or false positive(s) 314 associated therewith. In such examples, the confidence(s) generated by the semantic segmentation tool(s) 306 may be used classify a lidar blob (e.g., clusters of corresponding lidar points or voxels) representative of an object. In some examples, the confidences may represent an accuracy associated with the per-point classifications 312, vision classifications, the false positives, and/or other semantic segmentation outputs.

In some examples, the top-down segmentation tool 310 may receive lidar data from multiple lidar sensors and may aggregate the lidar data into a single representation of the associated environment (e.g., a single spin), such as with one or more aggregation tools 316. In some examples, the top-down segmentation tool 310 may be configured to generate a top-down representation of the environment based on the aggregated lidar data.

In various examples, the top-down segmentation tool 310 may receive point class(es) 312 and corresponding false positive(s) 314 associated with the lidar data from the multiple lidar sensors. The top-down segmentation tool 310 may aggregate the point class(es) 312 and corresponding false positives 314 to determine one or more lidar segments in the top-down representation. The lidar segment(s) may represent lidar blobs or objects in the environment, such as those indicated by multiple adjacent lidar points. In various examples, the aggregated false positive(s) 314 may represent an aggregated probability that the corresponding lidar segment or object is associated with particulate matter.

In various examples, the segmentation component 302 and/or the top-down segmentation tool 310 may provide the top-down representation of the environment to a classifier 318. The top-down representation may include lidar segments generated by the top-down segmentation tool 310 and aggregated false positives. In various examples, the classifier 318 may be configured to determine a classification associated with the lidar segments (e.g., objects corresponding to the lidar segments). In at least one example, the classifier 318 may be configured to classify a lidar segment as particulate matter.

In various examples, one or more vision semantic segmentation tools may receive sensor data 304. In some examples, the vision semantic segmentation tool(s) 308 may receive vision data (e.g., image data) captured by one or more camera sensors and may determine per-pixel classifications associated therewith, as discussed above. In various examples, the vision semantic segmentation tool(s) 308 may aggregate the vision per-pixel classifications and project the vision classifications into associated lidar data (e.g., paint points with the associated vision-based classifications). In various examples, the vision semantic segmentation tool(s) 308 may be trained utilizing machine learning techniques to identify and/or classify one or more objects in an image. As discussed below, the vision classifications may be provided to the classifier 318 configured to determine classifications associated with objects represented in the sensor data 304.

In various examples, the classifier 318 may determine a probability that the lidar segment includes particulate matter. In various examples, the probability and/or classification (as particulate matter) may be based on lidar data and/or vision data (e.g., data associated with images captured by camera sensors). In such examples, the lidar data and the vision data may correspond to the same environment. In some examples, the probability (and/or classification) may be based on vision classifications received from one or more vision semantic segmentation tools 308 configured to process image data, such as those described above. In various examples, the probability (and/or classification) may be based on one or more confidences associated with the semantic segmentation tool(s) 306 and/or the vision semantic segmentation tool(s) 308. The confidence(s) may represent a level of accuracy in the data output by a lidar semantic segmentation tool 306 and/or a vision semantic segmentation tool 308.

In various examples, the probability (and/or classification) may be based on the point class(es) 312 and corresponding false positive(s) 314. In some examples, the probability may be based on the aggregated false positives provided to the classifier 318 by the top-down segmentation tool 310, such as that associated with the top-down representation. In various examples, the probability (and/or classification) may be based on a confidence in the top-down representation, such as that provided by the top-down segmentation tool 310. In such examples, the confidence in the top-down representation may represent a level of accuracy in the data associated therewith.

In various examples, the probability (and/or classification) may be based on one or more features associated with the object(s) 106 and/or the lidar segment(s) associated therewith, as represented in the top-down representation. The features may include a size (e.g., width, height, depth, etc.), shape (e.g., geometry, symmetry, etc.), a location (e.g., proximity to a surface, height above the surface, etc.), a track (e.g., movement over time, speed, direction, etc.), proximity to another object and/or lidar segment, proximity to a location on another object and/or lidar segment (e.g., location associated with exhaust, etc.), or the like.

In various examples, the classifier 318 may provide classifications associated with segmented data (segmented, classified data) to a tracker 320. In some examples, the segmented and classified data may be provided to the tracker 320 based on a determination that the probabilities associated therewith are above a threshold (e.g., above 50% (0.50), 57% (0.57), etc.). In such an example, the classifier 318 may provide data to the tracker 320 based on a determination that there is at least a threshold probability that the data is associated with particulate matter.

In various examples, the tracker 320 may determine whether the segmented data is associated with an existing particulate matter track. A determination that the lidar segment is associated with an existing particulate matter track may be based on a distance between lidar blobs, a proximity to an object, speeds associated with the objects (e.g., movement over time), and the like. Based on a determination that the lidar segment is associated with an existing particulate matter track, the tracker 320 may associate the lidar segment with the track.

Based on a determination that the lidar segment is not associated with an existing particulate matter track, the tracker may be configured to generate a particulate matter track associated with the lidar segment. In various examples, the tracker 320 may generate the track based on a determination that the lidar segment includes a size associated with the associated lidar blob and that the lidar segment is active (e.g., dynamic, changing over time, etc.). A determination that the lidar segment is active may be based on a comparison of data associated therewith between lidar spins (e.g., metaspin of the lidar system). In various examples, the tracker 320 may be configured to generate and/or associate particulate matter data with particulate matter tracks periodically (e.g., every 50 milliseconds, 100 milliseconds, etc.), such as with each lidar spin. In at least one example, the tracker 320 may generate and/or associate particulate matter data with particulate matter tracks with every metaspin at a frequency of 100 milliseconds.

In various examples, a planner 322, such as planning component 118, may receive tracks and probabilities that the lidar segment (e.g., object) is associated with particulate matter. As discussed above, and in U.S. patent application Ser. No. 16/586,650 incorporated by reference herein above, the planner 322 may determine an action for the vehicle to take based on the tracks and/or the probabilities. The action may include maintaining a course and speed (e.g., the vehicle trajectory) associated with a path of the vehicle 104, slowing the vehicle 104 to a predetermined speed (e.g., 10 miles per hour, 20 kilometers per hour, etc.), stopping the vehicle 104, changing lanes, and/or adjusting a position in a lane. In various examples, the planner 322 may determine one or more trajectories for the vehicle to travel based on the determined action.

Figure 4:
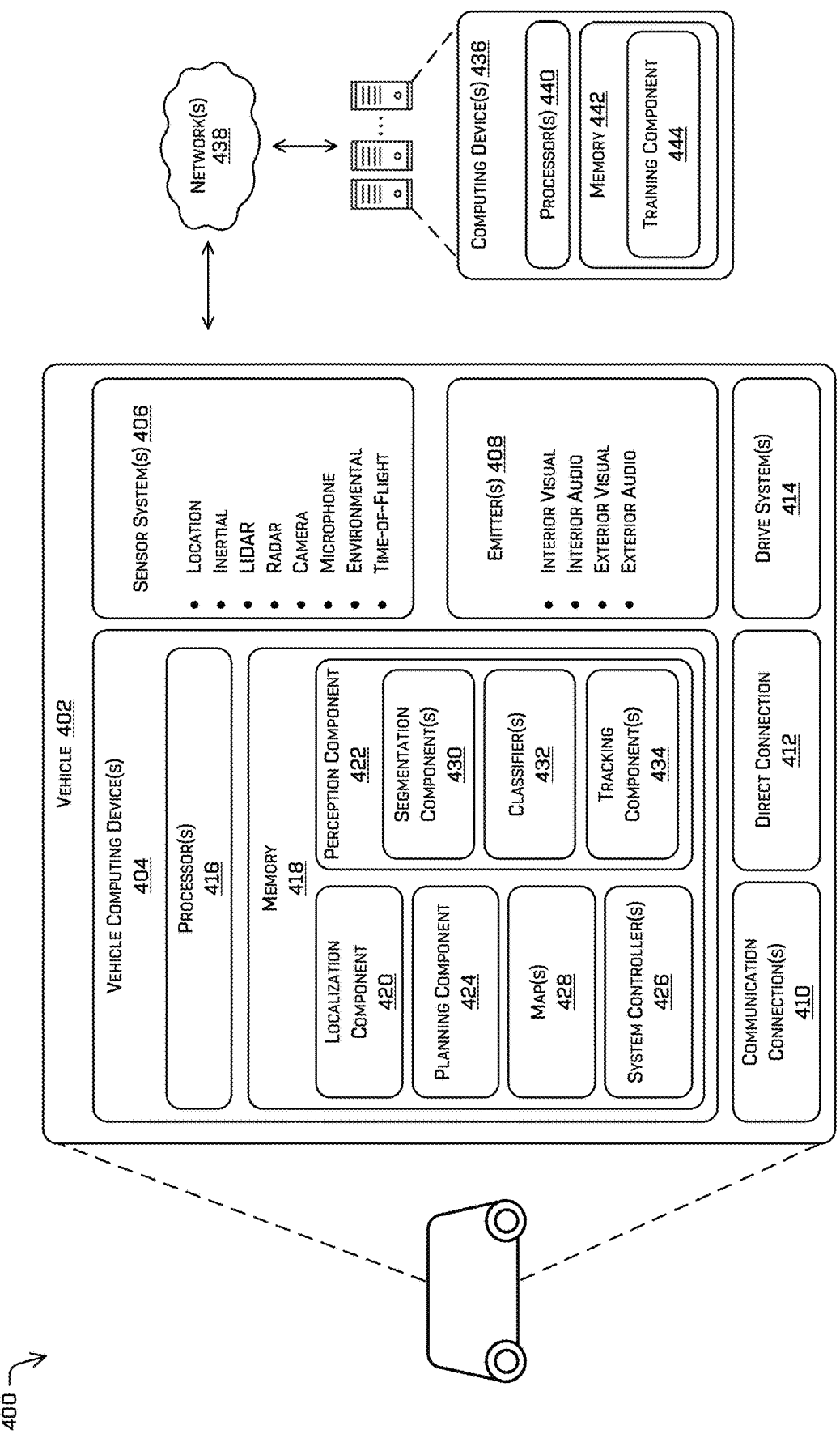
FIG. 4 depicts a block diagram of an example system for implementing the techniques described herein.

FIG. 4 depicts a block diagram of an example system 400 for implementing the techniques described herein. In at least one example, the system 400 can include a vehicle 402, such as vehicle 104. The vehicle 402 may include an autonomous, semi-autonomous, or manually controlled vehicle.

The vehicle 402 may include vehicle computing device(s) 404, one or more sensor systems 406, such as sensors 110 of FIG. 1, one or more emitters 408, one or more communication connections 410, at least one direct connection 412, and one or more drive systems 414. The vehicle computing device(s) 404 may include one or more processors 416 and memory 418 communicatively coupled with the one or more processors 416. In the illustrative example, the vehicle 402 is an autonomous vehicle; however, the vehicle 402 could be any other type of vehicle or robotic platform having at least an image capture device (e.g., camera enabled smartphone). In the illustrated example, the memory 418 of the vehicle computing device(s) 404 stores a localization component 420, a perception component 422, a planning component 424, one or more system controllers 426, and one or more maps 428. Though depicted in FIG. 4 as residing in the memory 418 for illustrative purposes, it is contemplated that the localization component 420, the perception component 422, the planning component 424, the one or more system controllers 426, and the one or more maps 428 may additionally, or alternatively, be accessible to the vehicle 402 (e.g., stored on, or otherwise accessible by, memory remote from the vehicle 402).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory, for determining to retrieve map data, and so forth, as discussed herein.

In some instances, the perception component 422 can include functionality to perform object detection, segmentation, and/or classification. In some examples, the perception component 422 can provide processed sensor data that indicates a presence of an entity or object that is proximate to the vehicle 402 and/or a classification of the entity as an entity type (e.g., car, wheel, pedestrian, cyclist, animal, building, tree, road surface, curb, sidewalk, stoplight, stop sign, lane marker, vehicle light, unknown, etc.).

In various examples, the perception component 422 may include a segmentation component 430, such as segmentation component 302. As discussed above, the segmentation component 430 may be configured to perform semantic segmentation on lidar data to determine per-point classifications of the lidar data and associated probabilities that the points are associated with particulate matter (e.g., false positive indications of being associated with a material object). As discussed above, the segmentation component 430 may generate a top-down representation of an environment based on the lidar data and the per-point classifications and associated probabilities. The top-down representation may include one or more lidar segments. The segmentation component 430 may provide the top-down representation with the lidar segments to one or more classifiers 432, such as classifier 318 to determine whether the lidar segments are associated with particulate matter. In some examples, the lidar segments may be provided to the classifier(s) 432 based on a determination that an aggregated probability that the lidar segments is above a threshold probability.

The segmentation component 430 may additionally be configured to perform semantic segmentation on vison data. In some examples, the segmentation component 430 may determine per-point (e.g., per pixel) classifications based on image data (e.g., data captured by sensors). In various examples, the segmentation component 430 may provide the vision classifications and/or confidences associated with semantic segmentation to the classifier(s) 432.

In various examples, the classifier(s) 432 may receive the top-down representation of the environment including the lidar segments and may determine a classification associated therewith. The classifications may include a head (e.g., of a pedestrian), a bicycle, a car, a pylon, particulate matter, and clutter (e.g., unclassified matter). In at least one example, the classifier 432 may be configured to determine whether the lidar segments are associated with particulate matter.

In various examples, the classifier 432 may determine a probability that the lidar segments are associated with particulate matter. As discussed above, the probability may be based on confidences associated with semantic segmentation (e.g., lidar and/or vision semantic segmentation), one or more confidences associated with the top-down representation, aggregated per-point probabilities of particulate matter association, and/or features associated with the lidar segments.

In additional or alternative examples, the perception component 422 may provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 422 performs detection, the perception component 422 may output detections of objects and/or features of objects detected in the image. Such detections may comprise two-dimensional bounding boxes (which may subsequently be used to crop the image) and/or masks of the detected object. In some examples, such detection may utilize a machine learning approach (e.g., scale-invariant feature transform (SIFT), histogram of oriented gradients (HOG), etc.) followed by a support vector machine (SVM) to classify objects depicted in images received from a camera and/or lidar data received from a lidar sensor of the sensor system(s) 406. Alternatively or additionally, detection may utilize a deep learning approach based on a convolutional neural network (CNN) to classify objects depicted in sensor data captured by the sensor system(s) 406. In various examples, the perception component 422 may utilize the machine learning approach to determine a probability that a detected entity is associated with a cloud particulate matter. In such examples, the perception component 422 may provide the probability and data associated with the cloud of particulate to a tracking component 434 to determine a track associated therewith, utilizing the techniques described herein.

As discussed above, the tracking component 434 may receive classifications associated with segmented data to a tracker as well as probabilities that the corresponding data is associated with particulate matter. In various examples, the tracking component 434 may determine whether the segmented data is associated with an existing particulate matter track. In various examples, the tracking component 434 may determine that the segmented data is associated with the existing particulate matter track based on a size of the segmented data and/or a size of the particulate matter track and, in some examples, further based on any one or more additional features (position, velocity, predicted position, color, and/or any other attributes). Based on a determination that the lidar segment is associated with an existing particulate matter track, the tracking component 434 may associate the lidar segment with the track.

Based on a determination that the lidar segment is not associated with an existing particulate matter track, the tracker may be configured to generate a particulate matter track associated with the lidar segment. In various examples, the tracking component 434 may generate the track based on a determination that the lidar segment includes a size associated with the associated lidar blob and that the lidar segment is active (e.g., dynamic, changing over time, etc.). In various examples, the tracking component 434 may generate and/or associate particulate matter data with particulate matter tracks periodically (e.g., every 50 milliseconds, 100 milliseconds, etc.), such as with each lidar spin.

In general, the planning component 424, such as planning component 118, may determine a path for the vehicle 402 to follow to traverse through an environment. The path may be determined based on the top-down representation of the environment including classified lidar segments and probabilities that each is associated with particulate matter. For example, the planning component 424 may determine various routes and vehicle trajectories such as to drive through the area corresponding to the lidar segments or to avoid them. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle 402 along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In various examples, the planning component 424 may receive data the top-down representation and probabilities that lidar segments are associated with particulate matter and may determine an action for the vehicle 402 to take based on the probabilities, as described herein. The action may include maintaining a trajectory or modifying a speed and/or direction of travel associated with the trajectory. In various examples, the planning component 424 may determine the action for the vehicle to take based at least in part on a track (e.g., particulate matter track) associated therewith. In various examples, the planning component 424 may determine the trajectory for the vehicle to optimize a safe operation of the vehicle.

The memory 418 may further include one or more maps 428 that may be used by the vehicle 402 to navigate within the environment, and/or to determine locations of features in the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 428 can include at least one map (e.g., images and/or a mesh). In some examples, the vehicle 402 can be controlled based at least in part on the map(s) 428. That is, the map(s) 428 can be used in connection with the localization component 420, the perception component 422, and/or the planning component 424 to determine a location of the vehicle 402, identify objects and/or environmental features in an environment, and/or generate routes and/or trajectories to navigate within an environment.

In some examples, the one or more maps 428 can be stored on a remote computing device(s) (such as the computing device(s) 436) accessible via network(s) 438. In some examples, multiple maps 428 can be stored based on, for example, a characteristic (e.g., type of entity, time of day, day of week, season of the year, etc.). Storing multiple maps 428 can have similar memory requirements, but increase the speed at which data in a map can be accessed. In some examples, the one or more maps 428 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well.

In at least one example, the vehicle computing device(s) 404 can include one or more system controllers 426, which can be configured to control steering, propulsion, braking, safety, emitters, communication, and other systems of the vehicle 402. The system controller(s) 426 can communicate with and/or control corresponding systems of the drive system(s) 414 and/or other components of the vehicle 402.

As can be understood, the components discussed herein (e.g., the localization component 420, the perception component 422, the planning component 424, the one or more system controllers 426, and the one or more maps 428 are described as divided for illustrative purposes. However, the operations performed by the various components can be combined or performed in any other component.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. Additionally or alternatively, the sensor system(s) 406 can send sensor data, via the one or more networks 438, to the one or more computing device(s) 436 at a particular frequency, after a lapse of a predetermined period of time, in near real-time, etc.

The vehicle 402 can also include one or more emitter(s) 408 for emitting light and/or sound, as described above. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 may also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 438. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 may also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the planning component 424, the one or more system controllers 426, and one or more maps 428 may process sensor data, as described above, and may send their respective outputs, over the one or more networks 438, to one or more computing devices 436. In at least one example, the localization component 420, the perception component 422, the planning component 424, the one or more system controllers 426, and one or more maps 428 may send their respective outputs to the computing device(s) 436 at a particular frequency, after a lapse of a predetermined period of time, in near real-time, etc.

In some examples, the vehicle 402 may send sensor data to one or more computing devices 436 via the network(s) 438. In some examples, the vehicle 402 can send raw sensor data to the computing device(s) 436. In other examples, the vehicle 402 may send processed sensor data and/or representations of sensor data to the computing device(s) 436. In some examples, the vehicle 402 may send sensor data to the computing device(s) 436 at a particular frequency, after a lapse of a predetermined period of time, in near real-time, etc. In some cases, the vehicle 402 may send sensor data (raw or processed) to the computing device(s) 436 as one or more log files.

The computing device(s) 436 may include processor(s) 440 and a memory 442 storing a training component 444. In some examples, the training component 444 may include functionality to train one or more models to detect objects and/or features of objects, determine (classify or regress) objects and/or features of objects, determine positions of objects in the environment, and the like. As discussed below with regard to FIG. 5, the training component 444 may be trained to determine classifications associated with each lidar point associated with an object (e.g., lidar blob) and a probability that each lidar point is associated with particulate matter. Additionally or alternatively, the training component 444 may be trained to classify one or more objects represented in vision data, such as that captured by one or more cameras. In such examples, the training component 444 may be trained utilizing training data including images of an environment annotated with object classifications. In such examples, the training data may include system (e.g., camera) and/or human annotated training data.

As noted herein, sensor data can be annotated or indicated as representing clouds of particulate matter, and such annotated or indicated data can be identified as training data. The training data can be input to a machine learning model where a known result (e.g., a ground truth, such as the known "future" attributes) can be used to adjust weights and/or parameters of the machine learning model to minimize an error. In some examples, the training component 444 may communicate information generated by the one or more models to the vehicle computing device(s) 404 to revise how to control the vehicle 402 in response to different situations.

For instance, aspects of some or all of the components discussed herein can include any models, algorithms, and/or machine learning algorithms. For example, in some instances, the components in the memory 442 (and the memory 418, discussed above) can be implemented as a neural network. In some examples, the training component 444 can utilize a neural network to generate and/or execute one or more models to improve various aspects of object trajectory estimation for use in trajectory planning of the vehicle 402.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 416 of the vehicle 402 and the processor(s) 440 of the computing device(s) 436 may be any suitable processor capable of executing instructions to process data and perform operations as described herein. By way of example and not limitation, the processor(s) 416 and 440 may comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 436 and/or components of the computing device(s) 436 may be associated with the vehicle 402. That is, the vehicle 402 can perform one or more of the functions associated with the computing device(s) 436, and vice versa.

Figure 5:
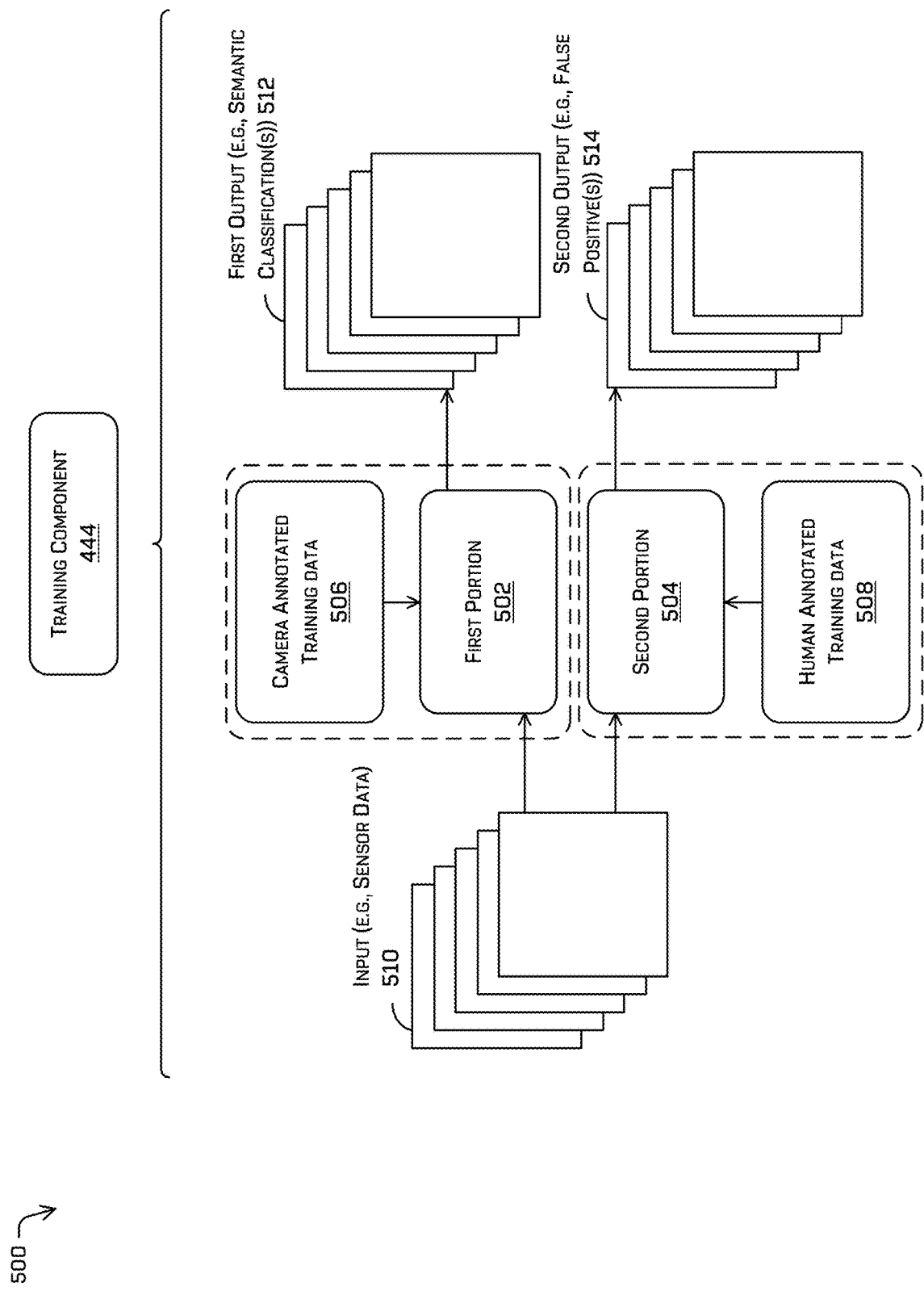
FIG. 5 depicts a block diagram of an example training component for training a machine learned model to implement the lidar semantic segmentation techniques described herein.

FIG. 5 depicts a block diagram 500 illustrating an example training component 444 for training a machine learned model to implement the lidar semantic segmentation techniques described herein.

As described above, a lidar semantic segmentation tool may include a first portion 502 configured to determine per-point classifications associated with lidar points in lidar data and a second portion 504. In various examples, the first portion 502 may be trained utilizing camera annotated training data 506 (also referred to herein as system-annotated training data). In some examples, the camera annotated training data 506 may include data captured by a vehicle as it traverses through an environment. In some examples, a camera and/or computing system may be configured to determine classifications of objects in the images included in the camera annotated training data 506. In such examples, the camera annotated training data 506 may include training data that is automatically annotated, such as without human input.

In various examples, the lidar semantic segmentation tool may include a second portion 504 configured to determine probabilities that each point in the lidar data is associated with particulate matter (e.g., false positive indication of being associated with a material object). In some examples, the second portion 504 may be trained utilizing human annotated training data 508. In some examples, the human annotated training data 508 may include data captured by a vehicle as it traverses through an environment, with objects represented therein annotated based on human input (e.g., manually).

The input 510 comprising one or more lidar data may be input to the first portion 502 and the second portion 504. In some examples, the first portion 502 and the second portion 504 may comprise a ResNet architecture. In some examples, the first portion 502 and the second portion 504 may comprise the ResNet architecture as a base backbone.

In some examples, the first portion 502 may output a first output 512 including a semantic classification associated with each lidar point associated with the input 510. The semantic classifications may include a car, truck, bicycle, motorcycle, pedestrian, particulate matter, navigable surface, free space, drivable surface, or the like. The second portion 504 may output a second output 514 including false positive indications representative of a likelihood that each point is associated with particulate matter. As discussed above, the first output 512 and the second output 514 may be aggregated to generate a top-down representation of an environment, which may be used to determine whether one or more detected objects represented by lidar points include particulate matter and may be disregarded by a vehicle planning system.

Figure 6:
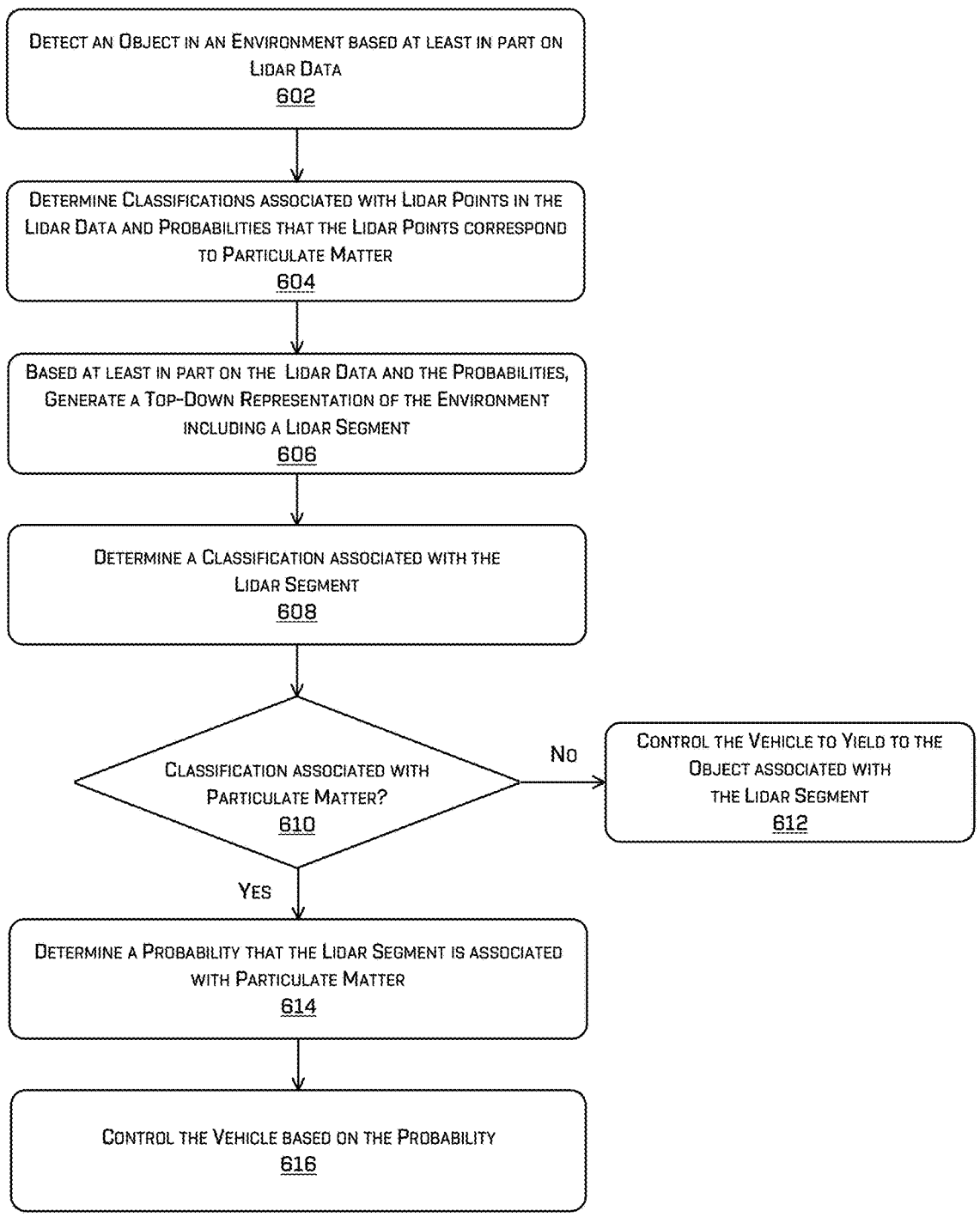
FIG. 6 depicts an example process for determining a probability that an object is associated with particulate matter and controlling a vehicle based on the probability.
Figure 7:
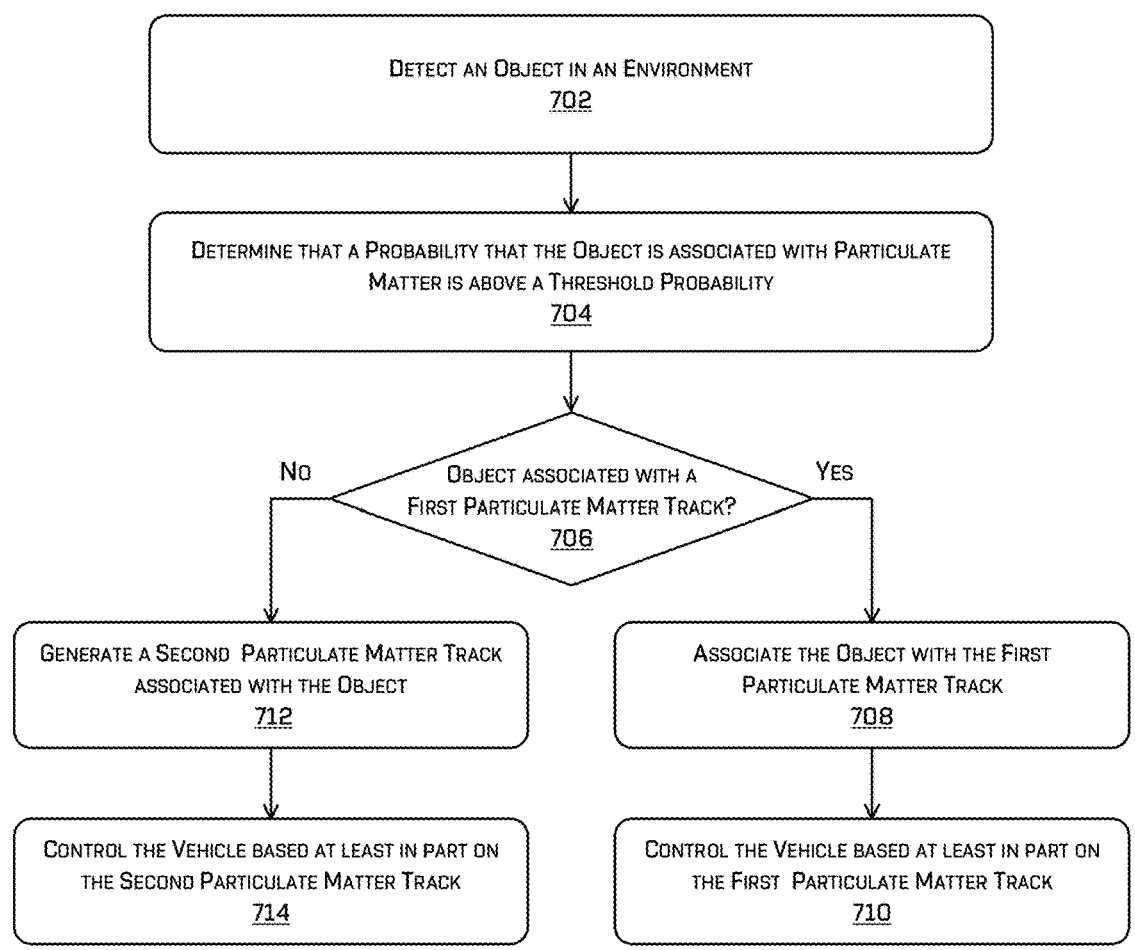
FIG. 7 depicts an example process for determining a track associated with particulate matter and controlling a vehicle based on the track.

FIGS. 6 and 7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 6 depicts an example process 600 for determining a probability that an object is associated with particulate matter and controlling the vehicle based on the probability. Some or all of the process 600 can be performed by one or more components in FIG. 4, as described herein. For example, some or all of the process 600 can be performed by the vehicle computing device(s) 404, the computing device(s) 436, or any other computing device or combination of computing devices. Further, any of the operations described in the example process 600 may be executed in parallel, in a different order than depicted in the process 600, omitted, combined with other processes, and the like.

At operation 602, the process may include detecting an object in an environment based at least in part on lidar data. In various examples, a vehicle computing system may receive the lidar data from one or more lidar sensors of a vehicle. As discussed above, the lidar points may correspond to lidar blobs (e.g., clusters of lidar points) that represent the object in the environment.

At operation 604, the process may include determining classifications associated with lidar points in the lidar data and probabilities that the lidar points correspond to particulate matter. In various examples, the classifications and/or probabilities may be determined utilizing semantic segmentation, such as by a semantic segmentation component of the vehicle computing system. In various examples, classifications may include per-point classifications associated with the lidar points. As discussed above, the probabilities may be determined based on a likelihood that the classification includes a false positive (e.g., false positive indication). In such examples, the false positive indication may represent a probability that a lidar point (and associated object) is associated with particulate matter.

At operation 606, the process may include generating a top-down representation of the environment including lidar segments. As discussed above, the vehicle computing system may generate the top-down representation utilizing the techniques described in the U.S. Patent Applications incorporated herein above. In various examples, the vehicle computing system may generate the top-down representation by aggregating the lidar data received from multiple lidar sensors. In such an example, the top-down representation may include an aggregation of lidar data, representing detected objects in the environment.

In various examples, the vehicle computing system may generate a lidar segment associated with the object based on the aggregated lidar data. In such examples, lidar segment may represent the object (e.g., lidar blob) in the top-down representation. In some examples, a size, shape, and/or location of the lidar segment in the top-down representation may correspond to the size, shape, and/or location of the object. In various examples, the vehicle computing system may aggregate the probabilities that individual lidar points, such as those associated with the object, correspond to particulate matter. In such examples, the top-down representation may include aggregated probabilities that a lidar blob associated with the object corresponds to particulate matter.

At operation 608, the process may include determining a classification associated with the lidar segment. In various examples, the classification may be determined utilizing a lidar classifier (of the vehicle computing system) configured to determine whether the lidar segment includes a cloud of particulate matter, car, person (e.g., head), bicycle, pylon, and/or clutter (e.g., unclassified segment). In various examples, the classification may be In various examples, the classification may be determined based on the lidar data and/or vision data (e.g., data associated with images captured by camera sensors). In such examples, the lidar data and the vision data may correspond to the same environment. In some examples, the classification may be determined based on vision classifications received from one or more semantic segmentation tools configured to process vision data, such as those described above. In various examples, the classification may be determined based on the per-point classifications associated with the object. In various examples, the classification may be determined based on one or more features associated with the lidar segment, as represented in the top-down representation. The features may include a size (e.g., width, height, depth, etc.), shape (e.g., geometry, symmetry, etc.), a location (e.g., proximity to a surface, height above the surface, etc.), a track (e.g., movement over time, speed, direction, etc.), proximity to another object and/or lidar segment, proximity to a location on another object and/or lidar segment (e.g., location associated with exhaust, etc.), or the like. In various examples, the classification may be based on one or more confidences associated with the per-point classifications determined utilizing semantic segmentation. The confidence(s) may represent a level of accuracy in the data output by a lidar semantic segmentation tool and/or a vision semantic segmentation tool. In some examples, the classification may be based on a confidence in the top-down representation. In such examples, the confidence in the top-down representation may represent a level of accuracy in the data associated therewith.

At operation 610, the process may include determining whether a classification associated with the lidar segment is associated with particulate matter. Based on a determination that classification is not associated with particulate matter ("No" at operation 610), the process may include, at operation 612, controlling the vehicle to yield to the object associated with the lidar segment. In some examples, a determination that the classification does not include particulate matter may represent an indication that the object associated with the lidar segment may be a material object that will impact vehicle operation. For example, the object may include a person, bicyclist, or other object that the vehicle does not want to conflict with.

Based on a determination that classification is associated with particulate matter ("Yes" at operation 610), the process may include, at operation 614, determining a probability that the lidar segment is associated with particulate matter. The probability may be based on the lidar data and/or vision data. The probability may be determined based on vision classifications (e.g., per-pixel classifications), lidar classifications (e.g., per-point classifications), per-point probabilities that the lidar points are associated with particulate matter (e.g., likelihood of false positive indications), features associated with the lidar blob representing the object, confidences associated with the per-point and/or per-pixel classifications and/or probabilities determined utilizing semantic segmentation and/or a confidence in the top-down representation.

At operation 616, the process may include controlling the vehicle based on the probability. In some examples, the vehicle computing system may be configured to determine a track associated with the object. In such examples, the vehicle computing system may additionally control the vehicle based on the track. The vehicle control may include maintaining a vehicle trajectory or modifying the vehicle trajectory, such as to avoid the object and/or to slow a forward speed and proceed with caution. Determining the vehicle trajectory based on the probability that the object is associated with particulate matter may ensure a maximum level of safety is maintained in vehicle operations.

FIG. 7 depicts an example process 700 for determining a track associated with particulate matter and controlling a vehicle based on the track. Some or all of the process 700 can be performed by one or more components in FIG. 4, as described herein. For example, some or all of the process 700 can be performed by the vehicle computing device(s) 404, the computing device(s) 436, or any other computing device or combination of computing devices. Further, any of the operations described in the example process 700 may be executed in parallel, in a different order than depicted in the process 700, omitted, combined with other processes, and the like.

At operation 702, the process may include detecting an object in an environment. In various examples, a vehicle computing system may receive the sensor data from one or more sensors of a vehicle. The sensors may include lidar sensors, radar sensors, camera sensors, time-of-flight sensors, sonar sensors, and the like. In at least one example, the object may be detected utilizing lidar data captured by the lidar sensors and may correspond to a lidar blob (e.g., cluster of adjacent lidar points).

At operation 704, the process may include determining that a probability that the object is associated with particulate matter is above a threshold probability (e.g., above 45% (0.45), 62% (0.62), etc.). As discussed above, the probability may be determined based on vision classifications (e.g., per-pixel classifications), lidar classifications (e.g., per-point classifications), per-point probabilities that lidar points in the sensor data are associated with particulate matter (e.g., likelihood of false positive indications), features associated with a lidar blob representing the object, confidences associated with per-point and/or per-pixel classifications and/or probabilities determined utilizing semantic segmentation and/or a confidence in a top-down representation generated based in part on aggregated lidar data.

At operation 706, the process may include determining whether the object is associated with a first particulate matter track. The first particulate matter track may include an existing particulate matter track (e.g., track generated based on previously received sensor data). In various examples, a determination that the object is associated with the existing particulate matter track (e.g., the first particulate matter track) may be based on a size of the object (e.g., lidar blob associated therewith).

Based on a determination that the object is associated with the first particulate matter track ("Yes" at operation 706), the process may include, at operation 708, associating the object with the first particulate matter track. A determination that the object is associated with an existing particulate matter track may be based on a distance between detected clouds of particulate matter (e.g., between lidar blobs), proximity to another (material) object, speeds associated with the object and/or the other object, and the like.

At operation 710, the process may include controlling the vehicle based at least in part on the first particulate matter track. In various examples, the vehicle computing system may control the vehicle based on the probability that the object is associated with particulate matter and the first particulate matter track associated therewith.

Based on a determination that the object is not associated with the first particulate matter track ("No" at operation 706), the process may include, at operation 712, generating a second particulate matter track associated with the object. In various examples, the vehicle computing system may generate the track based on a determination that the lidar segment includes a size associated with the associated lidar blob and that the lidar segment is active (e.g., dynamic, changing over time, etc.). A determination that the lidar segment is active may be based on a comparison of data associated therewith between lidar spins (e.g., metaspin of the lidar system).

In various examples, the vehicle computing system may be configured to generate and/or associate particulate matter data (operation 708) with particulate matter tracks periodically (e.g., every 50 milliseconds, 100 milliseconds, etc.), such as with each lidar spin. In at least one example, the vehicle computing system may generate and/or associate particulate matter data with particulate matter tracks with every metaspin at a frequency of 100 milliseconds.

At operation 714, the process may include controlling the vehicle based at least in part on the second particulate matter track. In some examples, the vehicle computing system may additionally control the vehicle based at least in part on the first particulate matter track. In various examples, the vehicle computing system may additionally control the vehicle based on the probability that the object is associated with particulate matter. As discussed above, controlling the vehicle may include maintaining a vehicle trajectory or modifying the vehicle trajectory, such as to avoid the object and/or to slow a forward speed and proceed with caution. Determining the vehicle trajectory based on the second particulate matter track (and the first particulate matter track) and the probability that the object is associated with particulate matter may ensure a maximum level of safety is maintained in vehicle operations.

Example Clauses

A: A system comprising: one or more processors; and one or more computer-readable media storing instructions executable by the one or more processors, wherein the instructions, when executed, cause the system to perform operations comprising: capturing sensor data of an environment using a sensor on an autonomous vehicle; determining that the sensor data represents an object in the environment; determining a first classification associated with a first data point of the sensor data, the first data point associated with the object; determining a second classification associated with a second data point of the sensor data, the second data point associated with the object; determining a first likelihood that the first classification is associated with particulate matter; determining a second likelihood that the second classification is associated with the particulate matter; determining a probability that the object comprises a region of particulate matter based at least in part on the first likelihood and the second likelihood; based at least in part on the probability meeting or exceeding a threshold probability, classifying the object as the region of particulate matter; and controlling the autonomous vehicle based at least in part on the probability.

B: The system as paragraph A describes, wherein the sensor data comprises lidar data captured by a lidar sensor, wherein determining the first likelihood comprises: inputting a first portion of the lidar data into a first machine learned model; and receiving, from the first machine learned model, the first likelihood, the first likelihood being associated with a point of the first portion of lidar data, and wherein determining the second likelihood comprises: generating a top-down representation of the environment based at least in part on a second portion of the lidar data; inputting the top-down representation into a second machine-learned model; and receiving, from the second machine learned model, the second likelihood.

C: The system as either paragraph A or paragraph B describes, wherein the determining the second likelihood is further based at least in part on associating the first likelihood with the top-down representation.

D: The system as any one of paragraphs A-C describe, the operations further comprising: inputting the first likelihood and second likelihood into a classifier, wherein the classifier is configured to determine the probability that the object comprises a region of particulate matter based at least in part on at least one of: the first classification; the first likelihood that the first classification is associated with the particulate matter; the second classification; the second likelihood that the second classification is associated with the particulate matter; per-pixel classifications of image data; a first confidence associated with the first classification or the second classification; a second confidence associated with the first likelihood or the second likelihood; a third confidence associated with the top-down representation; or one or more features associated with the object.

E: The system as any one of paragraphs A-D describe, the operations further comprising: determining a size of the object; determining, based at least in part on the size, whether the object is associated with a first object track; generating a second object track associated with the object, wherein controlling the autonomous vehicle is further based at least in part on the second object track.

F: A computer-implemented method comprising: receiving data points from a sensor; determining an object in an environment based at least in part on the data points; determining a classification associated with the data points; determining likelihoods that the classification is associated with particulate matter; and determine a probability that the object is associated with the particulate matter based at least in part on the likelihoods.

G: The computer-implemented method as paragraph F describes, further comprising: controlling a vehicle based at least in part on the probability, wherein controlling the vehicle comprises causing the vehicle to maintain a vehicle trajectory or modify the vehicle trajectory.

H: The computer-implemented method as either paragraph F or paragraph G describes, further comprising: determining at least one of a size or a shape of the object based at least in part on the data points; and generating a top-down representation of the environment based at least in part on a portion of the data points.

I: The computer-implemented method as any one of paragraphs F-H describe, further comprising: inputting the likelihoods into a classifier, wherein the classifier is configured to determine the probability that the object is associated with the particulate matter based at least in part on at least one of: an aggregated likelihood of the likelihoods associated with at least a portion of data points associated with the object; an overlap between a segment and another segment, wherein the segment and the other segment are determined based at least in part on a top down segmentation of the data points; or a proximity between the segment and the other segment.

J: The computer-implemented method as any one of paragraphs F-I describe, further comprising: determining that a classification of the object comprises a region of particulate matter, wherein the classification is based at least in part on at least one of: the classification associated with the data points; the likelihoods that the classification is associated with the particulate matter; classifications of image data; a first confidence associated with the classifications; a second confidence associated with the likelihoods; or a feature associated with the object.

K: The computer-implemented method as any one of paragraphs F-J describe, wherein the classification of the data points is a first classification, the method further comprising: receiving image data from a camera; determining a second classification associated with the image data based at least in part on semantic segmentation of the image data; sending the second classification to a classifier configured to determine a classification of the object and the probability that the object comprises a region of particulate matter, wherein at least one of the classification of the object or the probability is based at least in part on the second classification associated with the image data.

L: The computer-implemented method as any one of paragraphs F-K describe, further comprising: determining that the probability meets or exceeds a threshold probability; and based at least in part on the probability meeting or exceeding the threshold probability, classifying the object as a region of particulate matter.

M: The computer-implemented method as any one of paragraphs F-L describe, further comprising: determining that the probability meets or exceeds a threshold probability; determining a size of the object; determining, based at least in part on the threshold probability and the size, whether the object is associated with an object track; and performing at least one of: based on a first determination that the object is associated with a first object track, associating the object with the first object track; or based on a determination that the object is not associated with the first object track, generating a second object track associated with the object.

N: The computer-implemented method as any one of paragraphs F-M describe, further comprising: receiving the classifications from a first machine learned model trained to determine the classifications, wherein the first machine learned model is trained, based at least in part on first training data comprising system annotated data, to determine per-point classifications associated with the data points; and receiving the likelihoods that the per-point classifications include false positive indications from a second machine learned model trained to determine the likelihoods, wherein the second machine learned model is trained, based at least in part on second training data comprising manually annotated data, to determine the likelihoods that the per-point classifications include the false positive indications.

O: A system or device comprising: a processor; and a non-transitory computer-readable medium storing instructions that, when executed, cause the processor to perform a computer-implemented method as any one of paragraphs F-N describe.

P: A system or device comprising: a means for processing; and a means for storing coupled to the means for processing, the means for storing including instructions to configure one or more devices to perform a computer-implemented method as any one of paragraphs F-N describe.

Q: One or more computer-readable media storing instructions that when executed by one or more processors perform operations comprising: receiving data points from a sensor; determining an object in an environment based at least in part on the data points; determining a classification associated with a point of the data points; determining a first likelihood that a first data point of the data points is associated with particulate matter; determining a second likelihood that a second data point of the data points is associated with the particulate matter; and determine a probability that the object is associated with the particulate matter based at least in part on the first likelihood and the second likelihood.

R: The one or more computer-readable media of paragraph O, the operations further comprising: generating a top-down representation of the environment based at least in part on an aggregation of at least a portion of the data points, wherein the top-down representation includes the object; inputting the top-down representation into a machine-learned model; and determining, based at least in part on the machine-learned model, the probability that the object is associated with the particulate matter.

S: The one or more computer-readable media of paragraph P, wherein the probability that the object is associated with the particulate matter is further based at least in part on at least one of: the classification associated with the point of the data points; classifications of image data; a first confidence associated with at least one of the classification associated with the point or the classifications of image data; a second confidence associated with at least one of the first likelihood or the second likelihood; or a feature associated with the object.

T: The one or more computer-readable media of paragraph O, wherein the classification of the point of the data points is a first classification, the operations further comprising: receiving image data from a camera; determining a second classification associated with the image data based at least in part on semantic segmentation of the image data; sending the second classification to a classifier configured to determine a classification of the object and the probability that the object is associated with the particulate matter, wherein at least one of the classification of the object or the probability is based at least in part on the second classification associated with the image data.

U: The one or more computer-readable media of paragraph O, wherein the classification, the first likelihood and the second likelihood are determined utilizing at least one machine-learned model trained based at least in part on at least one of system annotated data or manually annotated data.

V: The one or more computer-readable media of paragraph O, the operations further comprising: determining that the probability meets or exceeds a threshold probability; determining, based at least in part on the probability meeting or exceeding the threshold probability, whether the object is associated with a first object track, the first object track indicative of historical positions; based at least in part on determining whether the object is associated with the first object track, generating a second object track associated with the object; and controlling an autonomous vehicle based at least in part on the second object track.

While the example clauses described above are described with respect to one particular implementation, it should be understood that, in the context of this document, the content of the example clauses can also be implemented via a method, device, system, a computer-readable medium, and/or another implementation. Additionally, any of examples A-V may be implemented alone or in combination with any other one or more of the examples A-V.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
  capturing sensor data of an environment using a sensor on an autonomous vehicle;
  determining that the sensor data represents an object in the environment;
  determining a first classification associated with a first data point of the sensor data, the first data point associated with the object;
  determining a second classification associated with a second data point of the sensor data, the second data point associated with the object;
  determining a first likelihood that the first classification is associated with particulate matter;
  determining a second likelihood that the second classification is associated with the particulate matter;
  determining a probability that the object comprises a region of particulate matter based at least in part on the first likelihood and the second likelihood;
  based at least in part on the probability meeting or exceeding a threshold probability, classifying the object as the region of particulate matter; and
  controlling the autonomous vehicle based at least in part on the probability.

2. The system of claim 1,
wherein the sensor data comprises lidar data captured by a lidar sensor,
wherein determining the first likelihood comprises:
  inputting a first portion of the lidar data into a first machine learned model; and
  receiving, from the first machine learned model, the first likelihood, the first likelihood being associated with a point of the first portion of lidar data, and
wherein determining the second likelihood comprises:
  generating a top-down representation of the environment based at least in part on a second portion of the lidar data;
  inputting the top-down representation into a second machine-learned model; and
  receiving, from the second machine learned model, the second likelihood.

3. The system of claim 2, wherein the determining the second likelihood is further based at least in part on associating the first likelihood with the top-down representation.

4. The system of claim 1, the operations further comprising:
inputting the first likelihood and second likelihood into a classifier, wherein the classifier is configured to determine the probability that the object comprises a region of particulate matter based at least in part on at least one of:
the first classification;
the first likelihood that the first classification is associated with the particulate matter;
the second classification;
the second likelihood that the second classification is associated with the particulate matter;
per-pixel classifications of image data;
a first confidence associated with the first classification or the second classification;
a second confidence associated with the first likelihood or the second likelihood;
a third confidence associated with a top-down representation; or
one or more features associated with the object.

5. The system of claim 1, the operations further comprising:
determining a size of the object;
determining, based at least in part on the size, whether the object is associated with a first object track;
generating a second object track associated with the object,
wherein controlling the autonomous vehicle is further based at least in part on the second object track.

6. A method comprising:
receiving data points from a sensor;
determining an object in an environment based at least in part on the data points;
determining a classification associated with the data points;
determining likelihoods that the classification is associated with particulate matter;

determining a probability that the object is associated with the particulate matter based at least in part on the likelihoods; and controlling a vehicle based at least in part on the probability.

7. The method of claim 6,
wherein determining the probability further comprises determining the probability that the object is associated with a region of the particulate matter based at least in part on the likelihoods, and
wherein controlling the vehicle comprises causing the vehicle based at least in part on the probability to maintain a vehicle trajectory or modify the vehicle trajectory.

8. The method of claim 6, further comprising:
determining at least one of a size or a shape of the object based at least in part on the data points; and
generating a top-down representation of the environment based at least in part on a portion of the data points.

9. The method of claim 6, further comprising:
inputting the likelihoods into a classifier, wherein the classifier is configured to determine the probability that the object is associated with the particulate matter based at least in part on at least one of:
an aggregated likelihood of the likelihoods associated with at least a portion of data points associated with the object;
an overlap between a segment and another segment, wherein the segment and the other segment are determined based at least in part on a top down segmentation of the data points; or
a proximity between the segment and the other segment.

10. The method of claim 6, further comprising:
determining that a classification of the object comprises a region of particulate matter,
wherein the classification is based at least in part on at least one of:
the classification associated with the data points;
the likelihoods that the classification is associated with the particulate matter;
classifications of image data;
a first confidence associated with the classifications;
a second confidence associated with the likelihoods; or
a feature associated with the object.

11. The method of claim 6, wherein the classification of the data points is a first classification, the method further comprising:
receiving image data from a camera;
determining a second classification associated with the image data based at least in part on semantic segmentation of the image data;
sending the second classification to a classifier configured to determine a classification of the object and the probability that the object comprises a region of particulate matter,
wherein at least one of the classification of the object or the probability is based at least in part on the second classification associated with the image data.

12. The method of claim 6, further comprising:
determining that the probability meets or exceeds a threshold probability; and
based at least in part on the probability meeting or exceeding the threshold probability, classifying the object as a region of particulate matter.

13. The method of claim 6, further comprising:
determining that the probability meets or exceeds a threshold probability;
determining a size of the object;
determining, based at least in part on the threshold probability and the size, whether the object is associated with an object track; and
performing at least one of:
based on a first determination that the object is associated with a first object track, associating the object with the first object track; or
based on a determination that the object is not associated with the first object track, generating a second object track associated with the object.

14. The method of claim 6, further comprising:
receiving the classifications from a first machine learned model trained to determine the classifications, wherein the first machine learned model is trained, based at least in part on first training data comprising system annotated data, to determine per-point classifications associated with the data points; and
receiving the likelihoods that the per-point classifications include false positive indications from a second machine learned model trained to determine the likelihoods, wherein the second machine learned model is trained, based at least in part on second training data comprising manually annotated data, to determine the likelihoods that the per-point classifications include the false positive indications.

15. One or more non-transitory computer-readable media storing instructions that when executed by one or more processors perform operations comprising:
receiving data points from a sensor;
determining an object in an environment based at least in part on the data points;
determining a classification associated with a point of the data points;
determining a first likelihood that a first data point of the data points is associated with particulate matter;
determining a second likelihood that a second data point of the data points is associated with the particulate matter;
determine a probability that the object is associated with the particulate matter based at least in part on the first likelihood and the second likelihood; and
controlling a vehicle based at least in part on the probability.

16. The one or more non-transitory computer-readable media of claim 15, the operations further comprising:
generating a top-down representation of the environment based at least in part on an aggregation of at least a portion of the data points, wherein the top-down representation includes the object;
inputting the top-down representation into a machine-learned model; and
determining, based at least in part on the machine-learned model, the probability that the object is associated with the particulate matter.

17. The one or more non-transitory computer-readable media of claim 16, wherein the probability that the object is associated with the particulate matter is further based at least in part on at least one of:
the classification associated with the point of the data points;
classifications of image data;
a first confidence associated with at least one of the classification associated with the point or the classifications of image data;

a second confidence associated with at least one of the first likelihood or the second likelihood; or a feature associated with the object.

18. The one or more non-transitory computer-readable media of claim 15, wherein the classification of the point of the data points is a first classification, the operations further comprising:

receiving image data from a camera;

determining a second classification associated with the image data based at least in part on semantic segmentation of the image data;

sending the second classification to a classifier configured to determine a classification of the object and the probability that the object is associated with the particulate matter, wherein at least one of the classification of the object or the probability is based at least in part on the second classification associated with the image data.

19. The one or more non-transitory computer-readable media of claim 15, wherein the classification, the first likelihood and the second likelihood are determined utilizing at least one machine-learned model trained based at least in part on at least one of system annotated data or manually annotated data.

20. The one or more non-transitory computer-readable media of claim 15, the operations further comprising:

determining that the probability meets or exceeds a threshold probability;

determining, based at least in part on the probability meeting or exceeding the threshold probability, whether the object is associated with a first object track, the first object track indicative of historical positions; and based at least in part on determining whether the object is associated with the first object track, generating a second object track associated with the object, wherein controlling the vehicle further comprises controlling the vehicle based at least in part on the second object track.

* * * * *